US012325723B2

(12) United States Patent
Loccufier

(10) Patent No.: US 12,325,723 B2
(45) Date of Patent: Jun. 10, 2025

(54) ACYLPHOSPHINEOXIDE INITIATORS

(71) Applicant: Agfa NV, Mortsel (BE)

(72) Inventor: Johan Loccufier, Mortsel (BE)

(73) Assignee: Agfa NV, Mortsel (BE)

( * ) Notice: Subject to any disclaimer, the term of this patent is extended or adjusted under 35 U.S.C. 154(b) by 1204 days.

(21) Appl. No.: 17/252,585

(22) PCT Filed: Jun. 4, 2019

(86) PCT No.: PCT/EP2019/064436
§ 371 (c)(1),
(2) Date: Dec. 15, 2020

(87) PCT Pub. No.: WO2019/243039
PCT Pub. Date: Dec. 26, 2019

(65) Prior Publication Data
US 2021/0261581 A1    Aug. 26, 2021

(30) Foreign Application Priority Data
Jun. 19, 2018   (EP) .................... 18178501

(51) Int. Cl.
C07F 9/53     (2006.01)
C07F 9/32     (2006.01)
C09D 11/101   (2014.01)
C09D 11/38    (2014.01)

(52) U.S. Cl.
CPC .......... *C07F 9/5337* (2013.01); *C07F 9/3252* (2013.01); *C09D 11/101* (2013.01); *C09D 11/38* (2013.01)

(58) Field of Classification Search
None
See application file for complete search history.

(56) References Cited

U.S. PATENT DOCUMENTS

2007/0027229 A1   2/2007   Moszner et al.
2015/0344711 A1   8/2015   Venkataraman et al.

FOREIGN PATENT DOCUMENTS

| CN | 1896083 A     | 1/2007  |
| CN | 104995266 A   | 10/2015 |
| CN | 107400144 A   | 11/2017 |
| CN | 110078761 A   | 8/2019  |
| EP | 3241874 A1    | 11/2017 |
| EP | 3656824 A1    | 5/2020  |
| JP | 2012062280 A  | 3/2012  |
| JP | 2014-070103 A | 4/2014  |
| JP | 2014196425 A  | 10/2014 |
| WO | 2013/091521 A1| 6/2013  |
| WO | 2014/051026 A1| 4/2014  |
| WO | 2014/129213 A1| 8/2014  |
| WO | 2020/109148 A1| 6/2020  |

OTHER PUBLICATIONS

Cherkasov et al. Russian Journal of General Chemistry (Translation of Zhurnal Obshchei Khimii) (2001), 71(3), 343-347 (cited in PTO-892 attached herewith).*
First Examination Report dated Mar. 30, 2021 relating to Indian Application No. 202017054011, 7 pages.
Written Opinion relating to PCT/EP2019/064436 dated Aug. 20, 2019, 5 pages.
International Search Report relating to PCT/EP2019/064436 dated Aug. 20, 2019, 3 pages.

* cited by examiner

*Primary Examiner* — Ana Z Muresan
(74) *Attorney, Agent, or Firm* — Leydig, Voit & Mayer, Ltd.

(57) ABSTRACT

An acyl phosphine oxide initiator wherein the acyl group is selected from the group consisting of a benzoyl group substituted by an urea group or an oxalylamide group; a 2,6-dimethyl benzoyl group substituted in position 3 by an urea group or an oxalylamide group; a 2,6-dimethoxy benzoyl group substituted in position 3 by an urea group or an oxalylamide group; a 2,4,6-trimethyl benzoyl group substituted in position 3 by an urea group or an oxalylamide group; and a 2,4,6-trimethoxybenzoyl group substituted in position 3 by an urea group or an oxalylamide group.

18 Claims, No Drawings

ACYLPHOSPHINEOXIDE INITIATORS

REFERENCE TO RELATED APPLICATIONS

This application is a 371 National Stage Application of PCT/EP2019/064436, filed Jun. 4, 2019, which claims the benefit of European Application No. 18178501.5, filed Jun. 19, 2018, the contents of which are incorporated by reference herein in their entirety.

TECHNICAL FIELD

The present invention relates to specific acylphosphineoxide initiators and their use in UV curable compositions, especially in UV curable inkjet inks.

BACKGROUND ART

Inkjet is changing the way designers approach interior decoration and fashion. Gravure, screen printing and flexography are being increasingly replaced by industrial inkjet printing systems as they allow for short production runs and personalized products at low cost. UV curable inkjet is especially favoured as technology as it is capable of reliably providing high image quality on non-absorbing substrates.

A disadvantage of UV curable inkjet is however that odor control measures are necessary for handling residual monomers after UV curing in a printed interior decoration article. Whereas photoinitiators themselves are rarely volatile, several of their degradation products are volatile enough to generate smell and potential toxicological risks. In indoor decoration, it is of particular importance to limit these volatiles for minimizing bad smell and toxicological risks.

Acyl phosphine oxide type of photoinitiators are a particular important class of photoinitiators, especially for LED curable compositions, which are becoming more and more important in radiation curing technology. However, acyl phosphine oxide type of photoinitiators have a tendency to form volatile aldehydes, such as mesitaldehyde, upon fragmentation and hydrogen transfer.

Functionalization on the mesitaldehyde fragment of acyl phosphine oxide is the most obvious approach to avoid the formation of mesitaldehyde. Several approaches have been disclosed in the patent literature.

WO 2014/051026 (FUJIFILM) and WO 2014/129213 (FUJIFILM) disclose a bromination strategy to functionalize the benzylic positions in acyl phosphine oxide type of photoinitiators followed by further derivatisation of the intermediate bromides to prepare oligomeric or polymerizable acyl phosphine oxide photoinitiators. Benzylic bromination of acyl phosphine oxide, having multiple benzylic positions is a statistical process, holding the risk of a mix of non-brominated and multiple brominated mesitaldehyde groups, still resulting in volatile degradation products formed from the functionalized photoinitiator mix.

JP 2014196425 (FUJIFILM) and WO 2014/129213 (FUJIFILM) disclose the synthesis of isocyanate functionalized acyl phosphine oxide photoinitiators. The isocyanate functionalized acyl phosphine oxide photoinitiators are further converted into carbamate functionalized photoinitiators. However, there is often a reluctance to use carbamates because of possible toxicity. Chronic encephalopathy is known to result from long-term exposure to low doses of carbamates.

The use of chloromethylated acyl phosphine oxide photoinitiators has been disclosed in WO 2013/091521 (SHENZHEN UV CHEMTECH). The chloromethylated acyl phosphine oxide photoinitiators are further concerted into the final photoinitiators. Chloromethylation reactions often produce highly carcinogenic bis(chloromethyl) ether as a by-product.

Polymerizable bisacyl phosphine oxide photoinitiators have been disclosed in US 2007027229 (IVOCLAR VIVADENT) and JP 2012062280 (KURARAY MEDICAL) for use in photopolymerizable dental materials. Although advantageous for dental applications, the low solubility of bisacyl phosphine oxide photoinitiators creates difficulties for the formulator to use in inkjet inks.

Furthermore, it is known that the carbon/phosphorus bond in acylphosphine oxides is easily split by nucleophilic compounds, such as water and alcohol. The photoinitiator is thereby gradually degraded, leading to a loss of activity of the initiators. However, unreacted acylphosphine oxide in a printed interior decoration article may upon cleaning with a cleaning liquid, usually containing water or alcohol, release volatile aldehydes, such as mesitaldehyde.

There is still a need for stable, effective acyl phosphine oxide photoinitiators exhibiting low odor after curing of UV curable inkjet inks used for indoor decoration applications.

SUMMARY OF INVENTION

In order to overcome the problems described above, preferred embodiments of the present invention have been realized with specific acyl phosphine oxide photoinitiators as defined in claim 1.

It was found that acyl phosphine oxide photoinitiators functionalized with high dipole self-complementary functional groups on the mesitaldehyde, selected from the group consisting of a urea group and an oxalyl amide group are particularly effective in reducing the odor of a cured UV curable composition. The figure here below illustrates how the volatile compounds are believed to interact leading to a reduction of bad odor.

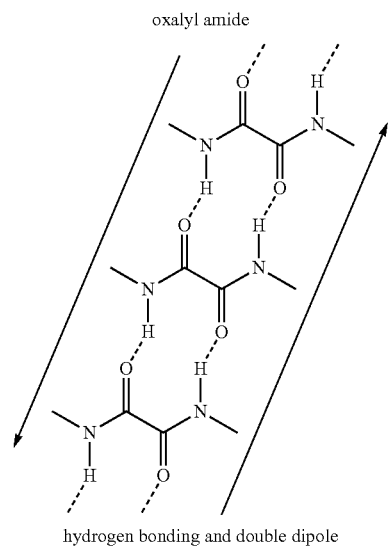

urea

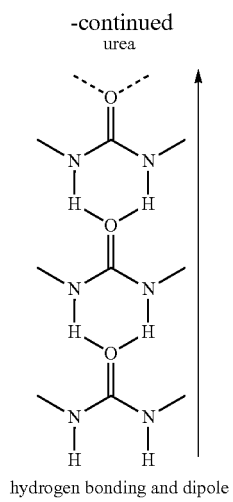

hydrogen bonding and dipole

It is an object of the present invention to provide a new class of functionalized acyl phosphine oxide photoinitiators.

It is a further objective of the present invention to provide a UV curable composition comprising at least one acyl phosphine oxide photoinitiator according to the present invention.

It is a further objective of the present invention to provide a UV curable ink jet ink comprising at least one acyl phosphine oxide photoinitiator according to the present invention.

These and other objectives will become apparent from the detailed description hereinafter.

DESCRIPTION OF EMBODIMENTS

Definitions

The term "multifunctional acyl phosphine oxide" means that the acyl phosphine oxide initiator includes more than one phosphine oxide group.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{25}$-alkyl group including a phenyl group or a naphthyl group.

A cyclic group includes at least one ring structure and may be a monocyclic- or polycyclic group, the latter meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulfur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms. More preferably a substituted or unsubstituted heteroaryl group is preferably a five- or six-membered ring substituted by one, two or three oxygen atoms, nitrogen atoms, sulphur atoms, selenium atoms or combinations thereof.

Unless otherwise specified an unsubstituted aryl group is preferably a phenyl group or naphthyl group.

Unless otherwise specified an acyl group is preferably a —C(=O)—R group wherein R is selected from the group consisting of an optionally substituted alkyl group, an optionally substituted aryl group, an optionally substituted heteroaryl group, an optionally substituted alkenyl group, an optionally substituted alkynyl group, an optionally substituted alkaryl group and an optionally substituted aralkyl group.

Acylphosphineoxide Initiators

In a preferred embodiment of the invention, the photoinitiator is an acyl phosphine oxide initiator wherein the acyl group is selected from the group consisting of a benzoyl group substituted by an urea group or an oxalylamide group; a 2,6-dimethyl benzoyl group substituted in position 3 by an urea group or an oxalylamide group; a 2,6-dimethoxy benzoyl group substituted in position 3 by an urea group or an oxalylamide group; a 2,4,6-trimethyl benzoyl group substituted in position 3 by an urea group or an oxalylamide group; and a 2,4,6-trimethoxybenzoyl group substituted in position 3 by an urea group or an oxalylamide group, with the proviso that the acyl phosphine oxide initiator contains no thiol group if the acyl group includes an urea group.

In one particularly preferred embodiment, the acyl phosphine oxide initiator is represented by Formula (I):

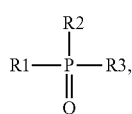

Formula (I)

with R1 representing a group according to Formula (11):

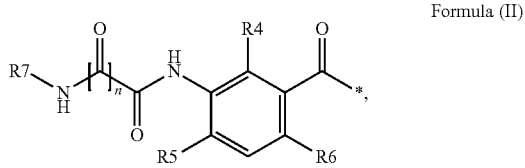

Formula (II)

wherein
* represents the point of attachment to the phosphineoxide group in Formula I);
R2 represents a substituted or unsubstituted aryl group, a substituted or unsubstituted heteroaryl group or OR8;
R3 represents a substituted or unsubstituted aryl a substituted or unsubstituted heteroaryl group or a group represented by Formula (II);
R4, R5 and R6 independently represent hydrogen, methyl or methoxy;
R7 and R8 independently represent hydrogen, a substituted or unsubstituted $C_1$-$C_{10}$ alkyl group; a substituted or unsubstituted $C_2$-$C_{10}$ alkenyl group, a substituted or unsubstituted $C_2$-$C_{10}$ alkynyl group, a substituted or unsubstituted aralkyl group, a substituted or unsubstituted alkaryl group, a substituted or unsubstituted heteroaryl group, a (meth)acrylate containing group or a (meth)acrylamide containing group; and
n represents an integer having a value of 0 or 1.

In another particularly preferred embodiment, the acyl phosphine oxide initiator is represented by Formula (III):

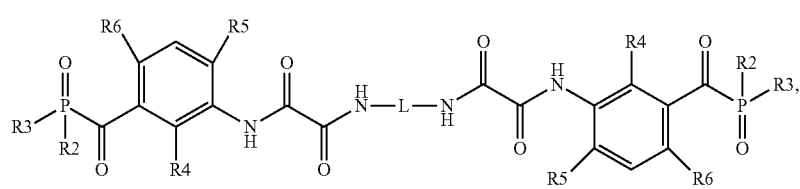

Formula (III)

wherein
R2 represents a substituted or unsubstituted aryl group, a substituted or unsubstituted heteroaryl group or OR8;
R3 represents a substituted or unsubstituted aryl group, a substituted or unsubstituted heteroaryl group or a group represented by Formula (II);

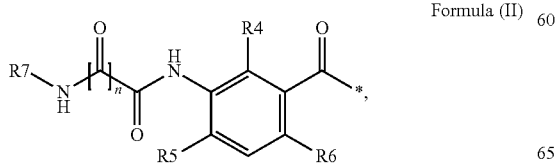

Formula (II)

* represents the point of attachment to the phosphineoxide group in Formula (I);
R4, R5 and R6 independently represent hydrogen, methyl or methoxy;
R7 and R8 independently represent hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted aralkyl group, a substituted or unsubstituted alkaryl group, a substituted or unsubstituted heteroaryl group, a (meth)acrylate containing group or a (meth)acrylamide containing group;
L represents a divalent linking group containing 2 to 50 carbon atoms; and n represents an integer having a value of 0 or 1.

In the acyl phosphine oxide initiator of Formula (I) and Formula (III), the substituents R4, R5 and R6 preferably represent methyl. This improves the stability of the acylphosphine oxide initiator, as the introduction of a methyl group in the ortho-position shields the carbonyl group from nucleophilic attack.

In the acyl phosphine oxide initiator of Formula (I) and Formula (III), the substituent R2 is preferably a phenyl group for reasons of stability.

In the acyl phosphine oxide initiator of Formula (III), the linking group L is preferably a substituted or unsubstituted alkylene group or a substituted or unsubstituted alkoxylated group. The linking group L is preferably further substituted by a group selected from the group consisting of a di-ester, a di-amide and a di-carbamate, a di-ester and a di-carbamate being particularly preferred. In a particularly preferred embodiment the linking group L is further substituted by a group selected from the group consisting of:

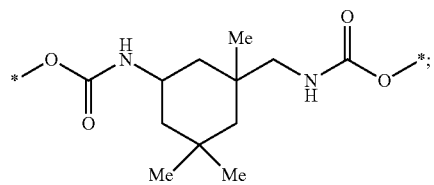

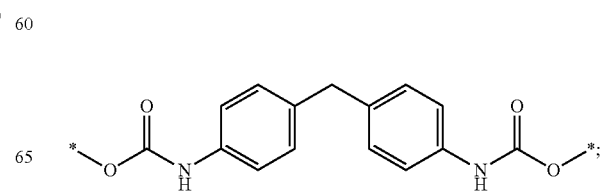

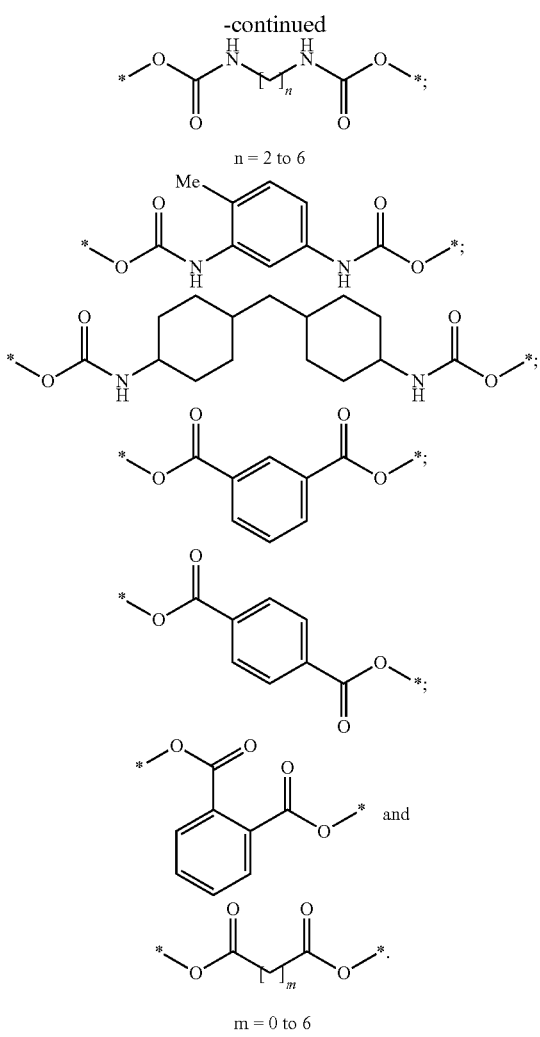

The acyl phosphine oxide initiator according to the present invention is preferably a polymerizable photoinitiator, a polymeric photoinitiator or a multifunctional photoinitiator.

In a more preferred embodiment, the multifunctional photoinitiator according to the present invention is a difunctional initiator, i.e. a photoinitiator containing two acylphosphine oxide moieties, more preferably two monoacylphosphine oxide moieties wherein the acyl groups are linked to each other. The latter is more effective in reducing bad odor after UV curing.

In another preferred embodiment, the photoinitiator according to the present invention is a polymeric photoinitiator having a molecular weight of at least 1000 Dalton. The weight average molecular weight $M_w$ of the polymeric photoinitiator according to the present invention is preferably less than 10000 Dalton, more preferred less than 5000 Dalton and most preferred less than 3000 Dalton. When the weight average molecular weight $M_w$ is kept between these ranges, UV curable compositions and inks can be made where the polymeric photoinitiator does not substantially increase the viscosity, thus making them suitable for inkjet printing.

The photoinitiator according to the present invention is preferably functionalized with at least one polymerizable group selected from the group consisting of an acrylate, a methacrylate, an acrylamide and a methacrylamide, an acrylate being particularly preferred.

In a preferred embodiment, the polymerizable group is included in the substituent R7 of the acyl phosphine oxide initiator of Formula (I) and Formula (III).

In a preferred embodiment, the substituent R7 of the acyl phosphine oxide initiator of Formula (I) and Formula (III) is an acrylate containing group. The latter allows for further reduction of odor as the volatile aldehydes are incorporated in the polymeric network upon UV curing.

Synthesis methods of acylphosphine oxides are well-known to the person skilled in the art of making initiators. Typical synthesis methods for acylphosphine oxide type of photoinitiators are disclosed in WO 2006/056541 (CIBA), WO 2005/014605 (CIBA), DE 10206117 (BASF) and WO 2014/016567 (LAMBSON). Specific methods for synthesizing acylphosphine oxide initiators of the present invention are disclosed in Examples 1 to 7 here below.

Low odor acyl phosphine oxide photoinitiators according to the present invention, functionalized with an oxalyl amide fragment are given below in Table 1 without being limited thereto.

TABLE 1
OXA-1 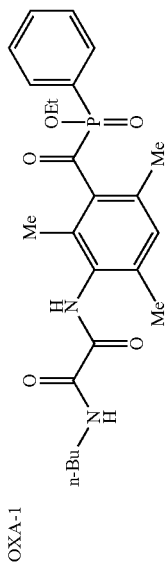
OXA-2 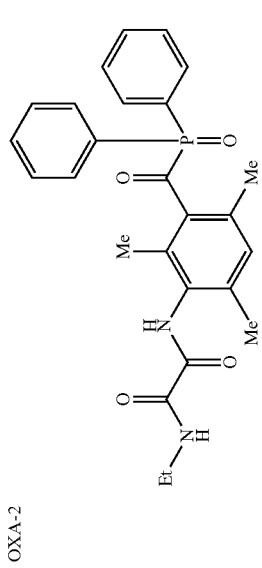
OXA-3 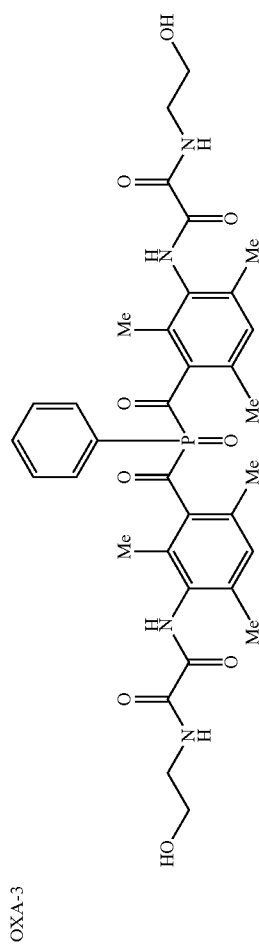
OXA-4 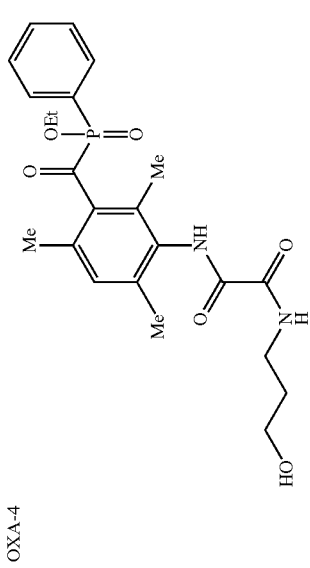

TABLE 1-continued
| | |
|---|---|
| OXA-5 | 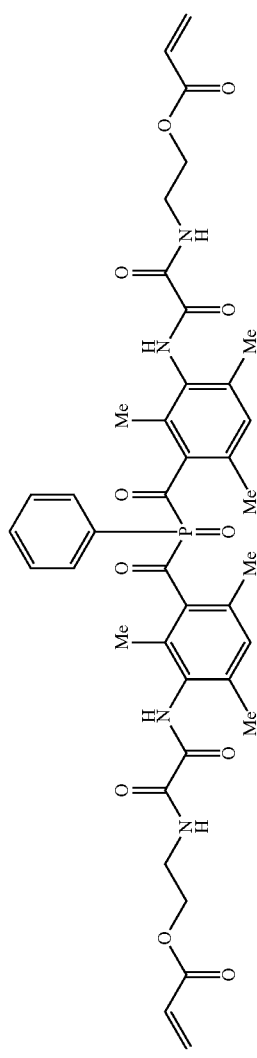 |
| OXA-6 | 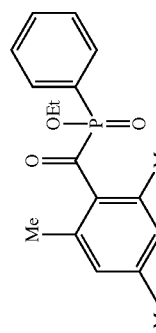 |
| OXA-7 | 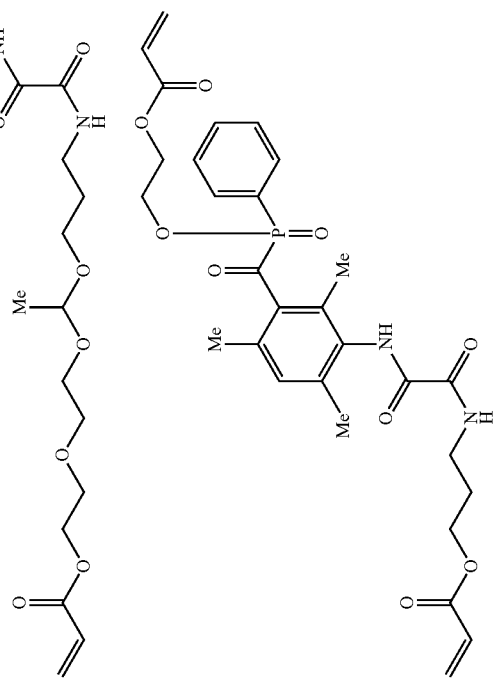 |

TABLE 1-continued
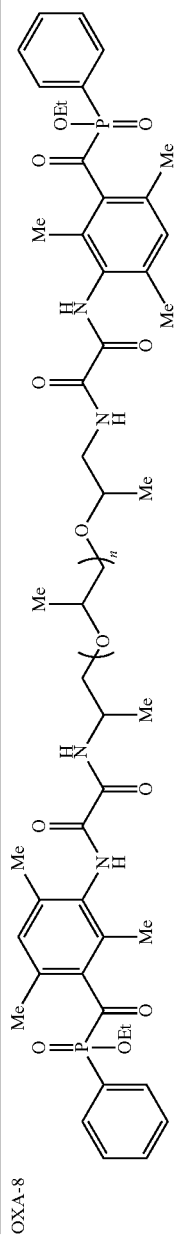
OXA-8
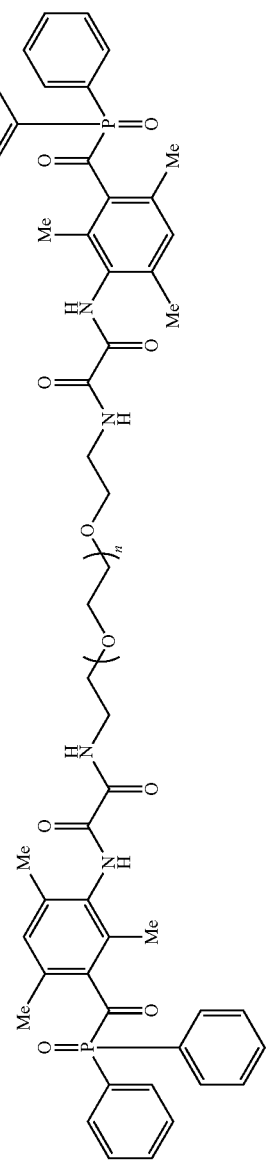
with n = 1 to 20
OXA-9
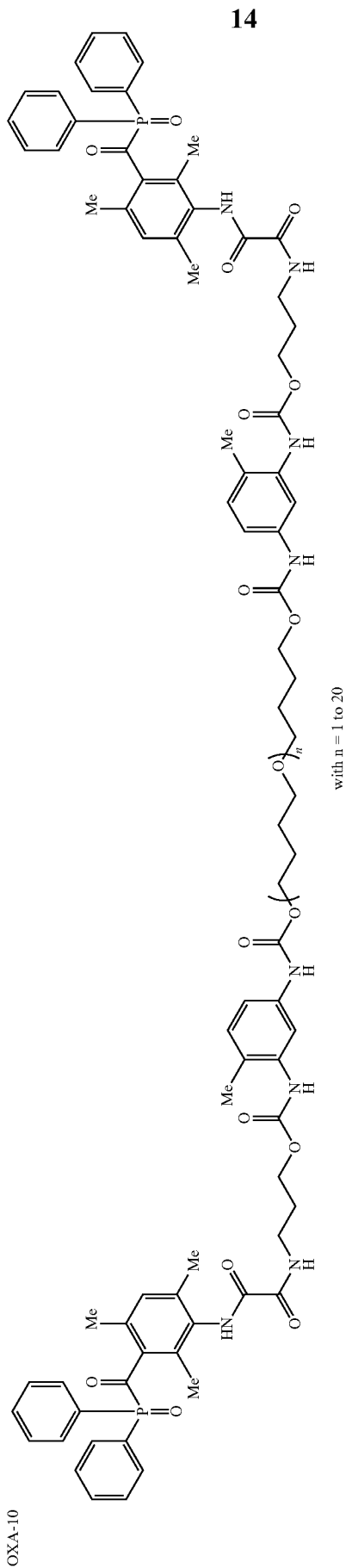
with n = 1 to 20
OXA-10

TABLE 1-continued
| OXA-11 | 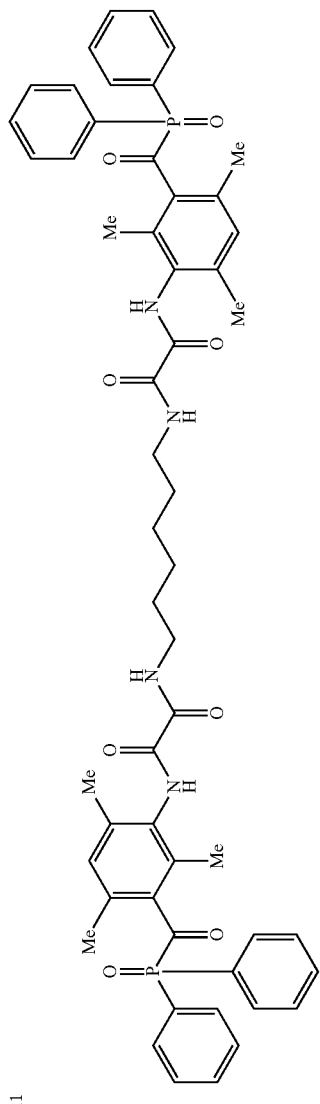 |
| OXA-12 | 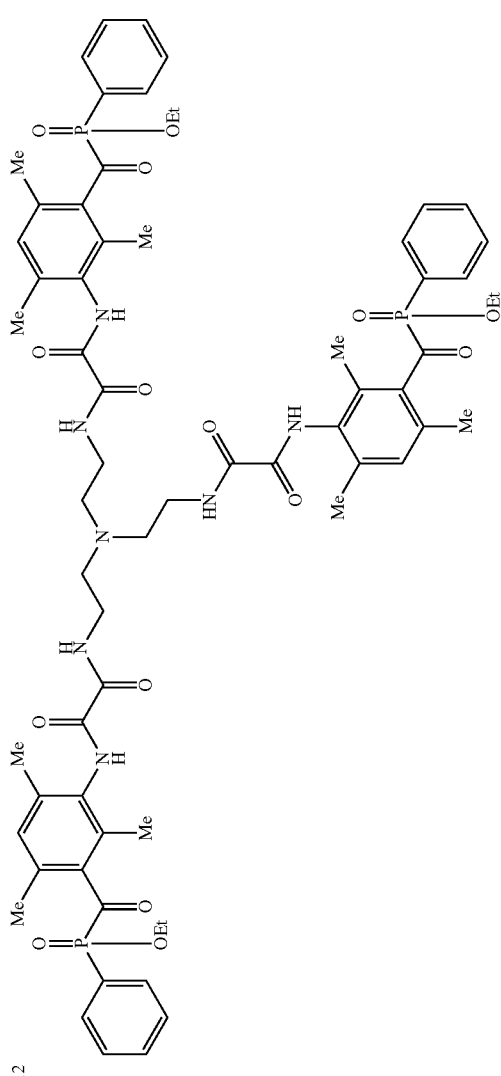 |

TABLE 1-continued
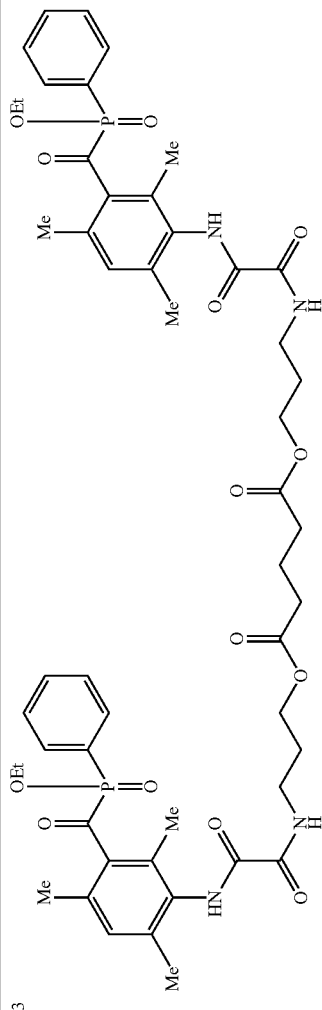
OXA-13
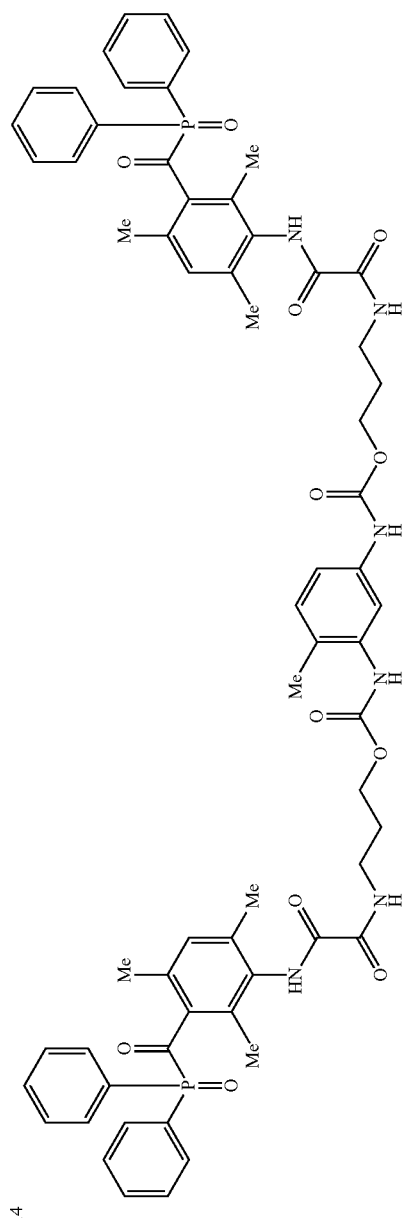
OXA-14

Low odor acyl phosphine oxide photoinitiators according to the present invention, functionalized with an urea fragment are given below in Table 2 without being limited thereto.
TABLE 2
UREA-1
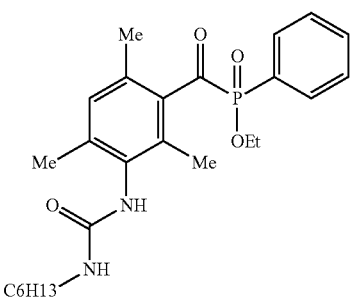
UREA-2
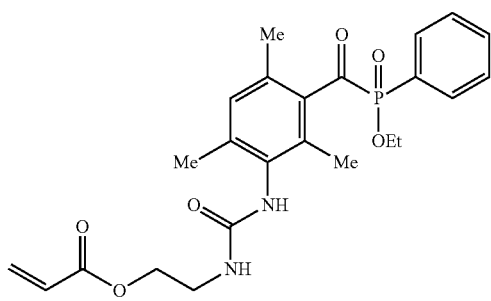 [SMILES: C=CC(=O)OCCNC(=O)Nc1c(C)cc(C)c(C(=O)P(=O)(OCC)c2ccccc2)c1C]
UREA-3
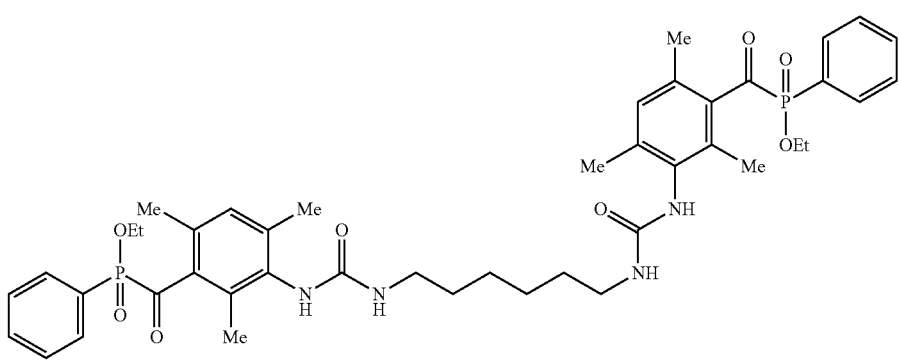 [SMILES: CCOP(=O)(C(=O)c1c(C)cc(C)c(NC(=O)NCCCCCCNC(=O)Nc2c(C)cc(C)c(C(=O)P(=O)(OCC)c3ccccc3)c2C)c1C)c1ccccc1]
UREA-4
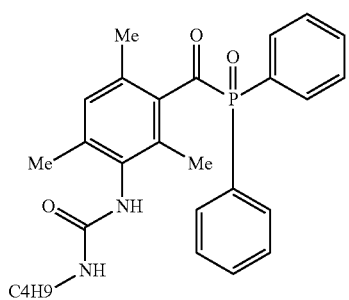

TABLE 2-continued

| UREA-5 | 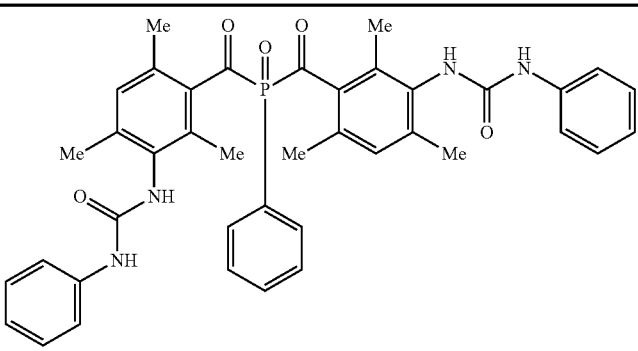 |
| --- | --- |
| UREA-6 | 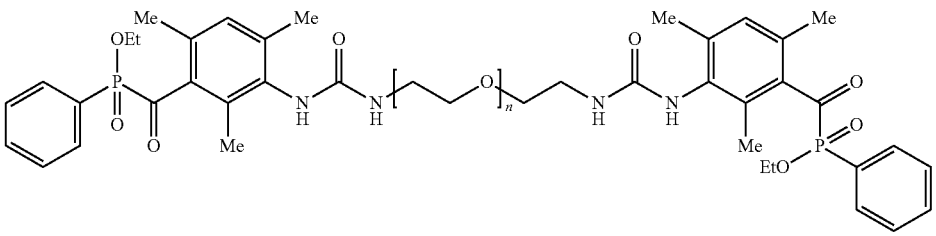 |

UV Curable Compositions and Inks

A preferred embodiment is a UV curable composition including a polymerizable compound and an acyl phosphine oxide initiator according to the invention. The UV curable composition is preferably a UV curable ink, more preferably a UV curable inkjet ink.

A UV curable composition may be colourless, and it may be used as a primer or a varnish. If such a UV curable composition is jettable, it may also be referred to as a colourless inkjet ink. A primer is usually applied for improving adhesion of a printed image, while a varnish is usually applied for influencing the gloss or as a protective topcoat for a printed image.

The UV curable compositions, inks or inkjet inks preferably include the photoinitiator according to the invention in an amount of 1 to 25 wt %, more preferably in an amount of 3 to 10 wt of the total weight of the UV curable composition, ink or inkjet ink.

In a more preferred embodiment, the UV curable composition contains also one or more colorants, most preferably colour pigments. A plurality of these (inkjet) inks may also be combined into an (inkjet) ink set for providing multicolour images.

The organic colour pigment is preferably dispersed in the liquid vehicle of the (inkjet) ink by a polymeric dispersant. The UV curable (inkjet) ink may contain a dispersion synergist to improve the dispersion quality and stability of the ink. Preferably, at least the magenta ink contains a dispersion synergist. A mixture of dispersion synergists may be used to further improve dispersion stability.

For printing multi-colour images, the UV curable (inkjet) ink is part of a UV curable (inkjet) ink set. A preferred UV curable (inkjet) ink set for printing different colours contains at least one or two but most preferably at least four UV curable (inkjet) inks including a photoinitiator according to the invention. The UV curable (inkjet) ink set is preferably a UV curable CMYK or CRYK (inkjet) ink set. This UV curable (inkjet) ink set may also be extended with extra inks such as violet, green, red, blue, and/or orange to further enlarge the colour gamut of the image. The UV curable inkjet ink set may also be extended by the combination of full density inkjet inks with light density inkjet inks. The combination of dark and light colour inks and/or black and grey inks improves the image quality by a lowered graininess.

The UV curable (inkjet) ink set may also include a colourless UV curable (inkjet) ink, such as a varnish or a primer. A varnish is used to enhance the glossiness of printed colour images. A primer can be used to improve the adhesion on difficult substrates like glass and polypropylene.

The UV curable (inkjet) ink set preferably also includes a UV curable white (inkjet) ink. The UV curable white (inkjet) ink preferably contains an inorganic white pigment such as a titanium dioxide, more preferably a rutile pigment, having an average particle size larger than 180 nm.

White inkjet inks are generally used for so-called "surface printing" or "backing printing" to form a reflection image on a transparent substrate. In surface printing, a white background is formed on a transparent substrate using a white ink and further thereon, a colour image is printed, where after the formed final image is viewed from the printed face. In so-called backing printing, a colour image is printed on a transparent substrate using colour inks and then a white ink is applied onto the colour inks, and the colour image is observed through the transparent substrate. In a preferred embodiment the UV curable colour inkjet ink is jetted on at least partially cured white inkjet ink. If the white ink is only partially cured, an improved wettability of the colour inkjet ink on the white ink layer is observed.

In one preferred embodiment, the UV curable inkjet ink contains an organic colour pigment in an amount of 6.0 to 13.0 wt % based on the total weight of the UV curable inkjet ink, and has a viscosity of at least 16.0 mPa·s at 45° C. and a shear rate of 10 s$^{-1}$. In a more preferred embodiment, a UV curable inkjet ink set is composed of at least three UV curable inkjet inks containing an organic colour pigment in an amount of 6.0 to 13.0 wt % based on the total weight of the UV curable inkjet ink, and each having a viscosity of at least 16.0 mPa·s at 45° C. and a shear rate of 10 s$^{-1}$ The UV curable inkjet ink is preferably a so-called 100% solids UV curable inkjet ink. This means that no solvents, i.e. water or organic solvent, are present. However sometimes a small amount, generally less than 1 or 2 wt % of water based on the total weight of the inkjet ink, can be present. This water was not intentionally added but came into the inkjet ink via other components as a contamination, such as for example hydrophilic monomer.

The UV curable inkjet ink preferably does not contain an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC. The UV curable inkjet ink preferably contains 0 to 10 wt %, more preferably no more than 5.0 wt % of an organic solvent based on the total weight of the UV curable inkjet ink.

Alternatively, the UV curable composition or (inkjet) ink includes a substantial amount of solvent and/or water, for example 20, 30 or more wt % of water and/or one or more organic solvents. Such an inkjet ink is usually called a hybrid inkjet ink as curing of a printed image involves both drying and UV curing.

A single polymerizable compound may be used for the polymerizable composition of the UV curable composition or (inkjet) ink, but usually a mixture of different polymerizable compounds to tune the ink properties, such as the adhesion to a set of substrates of the flexibility.

In one preferred embodiment of the UV curable (inkjet) ink, the polymerizable compound includes one or more acrylate groups. These polymerizable compounds allow for very fast curing in many industrial applications.

In another preferred embodiment of the UV curable (inkjet) ink, the polymerizable compound includes one or more polymerizable groups selected from the group consisting of an acrylamide, a methacrylamide, a vinyl ether group, a vinyl ester group, an allyl ether group, an allyl ester group, a vinyl carbonate group and an alkyne group. These polymerizable compounds are preferred for applications where skin irritation may represent an issue.

For inkjet indoor decoration, the polymerizable compound preferably includes a multifunctional hybrid monomer containing two or more different polymerizable groups per molecule, such as, for example both an acrylate group and a vinyl ether group. An especially useful monomer is 2-(2-vinyloxyethoxy)ethyl acrylate (VEEA), although other hybrid monomers such as those described in WO 2010/029017 A (AGFA) and EP 2130817 A (AGFA) would also be suitable. Preferably, the UV curable inkjet inks contains more than 20 wt %; and more preferably more than 25 or 30 wt % of one or more hybrid multifunctional monomers, based on the total weight of polymerizable compounds.

For having a good ejecting ability, the viscosity of the UV curable inkjet ink at the jetting temperature is preferably smaller than 50.0 mPa·s, more preferably smaller than 30.0 mPa·s at a shear rate of $10 \text{ s}^{-1}$ and a jetting temperature between 3° and 70° C.

The surface tension of the UV curable inkjet ink is preferably in the range of 20 mN/m to 30 mN/m at 25° C., more preferably in the range of about 22 mN/m to about 25 mN/m at 25° C. In these ranges, good ink spreading is obtained on a wide range of substrates.

The UV curable (inkjet) ink may further also contain at least one inhibitor or stabilizer for improving the thermal stability of the ink.

The UV curable (inkjet) ink may further also contain at least one surfactant for obtaining good spreading characteristics on a substrate.

Other Photoinitiators and Co-Initiators

In addition to the acyl phosphine oxide photoinitiator of the invention, the UV curable composition or (inkjet) ink may contain one or more other photoinitiators and/or co-initiators.

The photoinitiator in the UV curable composition or (inkjet) ink are preferably free radical initiators, more specifically a Norrish type I initiator or a Norrish type II initiator. A free radical photoinitiator is a chemical compound that initiates polymerization of monomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or a co-initiator. Both type I and type II photoinitiators can be used in the present invention, alone or in combination. The UV curable inkjet ink preferably includes no cationic photoinitiator.

Preferred free radical photoinitiators for indoor decoration applications are selected from the group consisting of polymerizable photoinitiators, polymeric photoinitiators and polyfunctional photoinitiators. A polyfunctional photoinitiator is a photoinitiator having two or more photoinitiating groups, e.g. two benzophenone groups and a thioxanthone group. In a more preferred embodiment, the one or more other photoinitiators are one or mare polymerizable photoinitiators. Such a photoinitiator results in a smaller viscosity than a polymeric photoinitiator, while still minimizing health risks in indoor decoration.

The polymerizable photoinitiators may be combined with other type of non-polymeric or non-polymerizable photoinitiators for indoor decoration applications at concentration levels in the inkjet ink causing no health risks.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 1000, Irgacure™ 1300, Irgacure™ 1870, Irgacure™ 2959, Darocur™ 1173, Darocur™4265 and Darocur™ ITX available from BASF AG, Lucerin™ TPO available from BASE AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

Preferred photoinitiators contain one or more photoinitiating functional groups derived from a Norrish type I-photoinitiator selected from the group consisting of benzoinethers, benzil ketals, α,α-dialkoxyacetophenones, α-hydroxyaikylphenones, α-aminoalkylphenones, acylphosphine oxides, acylphosphine sulphides, α-haloketones, α-halosulfones and phenylglyoxalates.

Preferred photoinitiators contain one or more photoinitiating functional groups derived from a Norrish type II-initiator selected from the group consisting of benzophenones, thioxanthones, 1,2-diketones and anthraquinones.

In a particularly preferred embodiment of the UV curable composition or (inkjet) ink, a combination of an acylphosphine oxide photoinitiator and a thioxanthone photoinitiator is used, preferably a polymeric or polymerizable thioxanthone photoinitiator, more preferably a polymerizable thioxanthone photoinitiator. The latter allows to achieving low viscosity Suitable diffusion hindered photoinitiators are also those disclosed in EP 2065362 A (AGFA) and EP 2161264 A (AGFA).

In a photoinitiating system, one of the photoinitiators can also function as a sensitizer enhancing the reactivity of another photoinitiator. Preferred sensitizers are polymerizable sensitizers such as those disclosed in EP 2053095 A (FUJIFILM).

In order to increase the photosensitivity further, the UV curable composition or inkjet ink may additionally contain co-initiators. Suitable examples of these co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino) benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates. When one or more of these co-initiators are included into the UV curable composition or (inkjet) ink, amounts are used causing no health risks.

A combination of a polymerizable co-initiator containing a tertiary amine and a polymeric co-initiator containing a tertiary amine may be advantageously used to adjust the viscosity of the UV curable inkjet ink.

Ethyl hexyl-4-dimethylaminobenzoate (EHA) is preferably present in the UV curable composition or (inkjet) ink in an amount of 0.5 wt % to 5.0 wt %, more preferably in an amount of 1.0 to 4.0 wt % and most preferably 3 wt % or less, wherein all wt % are based on the total weight of the UV curable composition or (inkjet) ink.

The at least one tertiary amine co-initiator may also be a polymerizable co-initiator containing a tertiary amine, more preferably a polymerizable co-initiator containing one or more 4-dialkylaminobenzoate groups, most preferably a polymerizable co-initiator containing one or more 4-dimethylaminobenzoate groups. Other preferred tertiary amine groups for the at least one polymerizable co-initiator containing a tertiary amine include aliphatic tertiary amine groups and piperazine groups.

The UV curable composition or (inkjet) ink according to the present invention preferably contains the polymerizable co-initiator containing a tertiary amine in an amount of 1.0 to 10.0 wt %, more preferably 2.0 to 7.0 wt % and most preferably 3.0 to 5.0 wt % wherein all wt % are based on the total weight of the UV curable composition or (inkjet) ink.

The at least one tertiary amine co-initiator may also be a polymeric co-initiator containing a tertiary amine, more preferably a polymeric co-initiator containing one or more 4-dialkylaminobenzoate groups, most preferably a polymeric co-initiator containing one or more 4-dimethylaminobenzoate groups. Other preferred tertiary amine groups for the at least one polymeric co-initiator containing a tertiary amine include aliphatic tertiary amine groups and piperazine groups.

In a preferred embodiment, the at least one polymeric co-initiator containing a tertiary amine is a polyether based polymer. Particularly preferred polymeric co-initiators are derivatives from ethoxylated trimethylolpropane, propoxylated trimethylolpropane, polyethylene oxide, polypropylene oxide, ethoxylated neopentyl glycol, propoxylated neopentylglycol, ethyleneoxide propylene oxide copolymers, ethoxylated glycerol, propoxylated glycerol, ethoxylated pentaerithritol, propoxylated pentaerythritol and polytetrahydrofurane.

In a further preferred embodiment, the at least one polymeric co-initiator containing a tertiary amine has a numeric average molecular weight of no more than 1500, more preferably of no more than 1000 and most preferably of no more than 750.

In a particularly preferred embodiment, the polymeric co-initiator containing a tertiary amine is selected from the group consisting of:

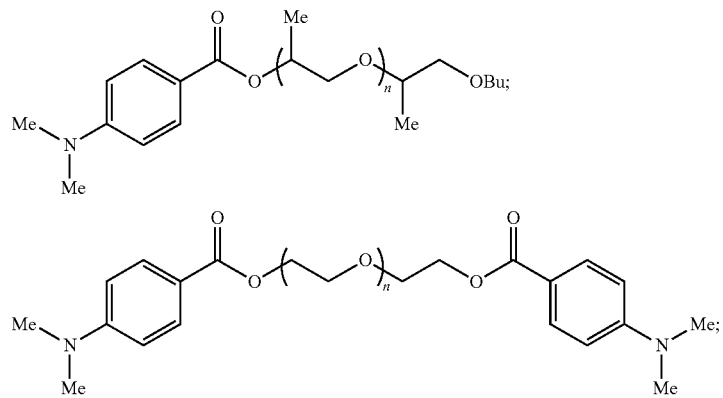

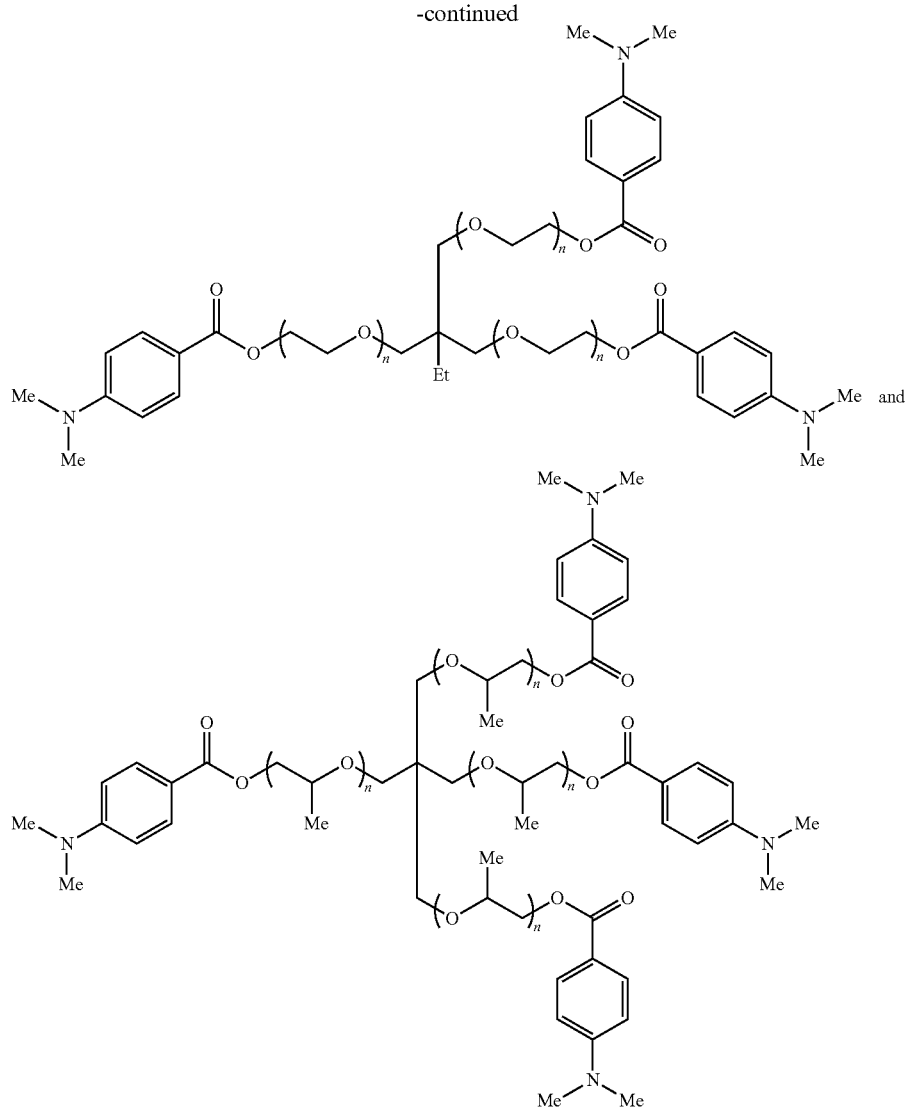

wherein the compound has a has a numeric average molecular weight of no more than 1500 or wherein n is an integer of 1 to 4.

Suitable corresponding polymeric co-initiators containing a tertiary amine are commercially available as Omnipol™ ASA (CASRN71512-90-8) from IGM Resins, Genopol™ AB-1 and AB-2 (CASRN1215019-68-3) from RAHN, and Speedcure™ 7040 (CASRN1182751-31-0) from LAMBSON.

Preferred polymeric co-initiators containing a tertiary amine are polymeric co-initiators having a dendritic polymeric architecture, more preferably a hyperbranched polymeric architecture. Preferred hyperbranched polymeric co-initiators are those disclosed in US 2006014848 (AGFA).

The UV curable composition or (inkjet) ink preferably includes the co-initiator in an amount of 0.1 to 30.0 wt %, more preferably in an amount of 0.5 to 10.0 wt %, most preferably in an amount of 1.0 to 5.0 wt % of the total weight of the UV curable composition or inkjet ink.

The UV curable composition or (inkjet) ink preferably does not include a photoinitiator selected from the group of 2-hydroxy 2-methyl propiophenone, benzophenone, 2-methyl benzophenone, 4-methyl benzophenone, 2,4,6-trimethylbenzo-phenone, 1-hydroxycyclohexyl phenylketone, 2,2-dimethoxy 2-phenyl acetophenone, 2-methyl 4'-(methylthio) 2-morpholinopropiophenone, 4-isopropyl 9H-thioxanthen-9-one, 2-isopropyl 9H-thioxanthen-9-one, and 2,4-diethyl 9H-thioxanthen-9-one. Such a UV curable composition or (inkjet) ink has no doubtful toxicology.

Polymerizable Compounds

Any polymerizable compound commonly known in the art may be employed. The polymerizable compound may be any monomer and/or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units.

In a UV curable composition or (inkjet) ink containing a substantial amount of water and/or organic solvents, the polymerizable compound may also be a cross-linkable polymer. In a hybrid inkjet ink, the cross-linkable polymer is preferably present as polymeric particle, for example as a latex, preferably an acrylate based latex or a polyurethane based latex.

Preferably a monomer or oligomer capable of free radical polymerization is used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the UV curable compositions and (inkjet) inks can be adjusted by varying the ratio between the monomers and oligomers.

Preferred monomers and oligomers are those listed in [0106] to [0115] in EP 1911814 A (AGFA).

A monofunctional polymerizable compound is generally used for enhancing the flexibility of a cured layer, whereas a polyfunctional polymerizable compound is used for enhancing scratch resistance of the cured layer.

A monofunctional polymerizable compound contains a single polymerizable group, preferably a free radical polymerizable group selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, the monofunctional polymerizable compounds are selected from acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl (meth)acrylate, cyclohexyl(meth)acrylate, and 2-ethylhexyl (meth)acrylate; aryl(meth)acrylates such as benzyl(meth) acrylate, and phenyl(meth)acrylate; hydroxyalkyl(meth) acrylates such as hydroxyethyl(meth)acrylate, and hydroxypropyl(meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylcaprolactam, vinylpyrrolidone, vinylimidazole, vinylnaphthalene, and vinyl halides; vinylethers such as vinylmethyl ether; vinylesters of carboxylic acids such as vinylacetate, vinylbutyrate, and vinyl benzoate. In a more preferred embodiment, the monofunctional polymerizable compounds are selected from monoacrylates and vinyllactams, such as N-vinylcaprolactam. Particularly preferred monofunctional polymerizable compounds are selected from the group consisting of isoamyl acrylate, stearyl acrylate, lauryl acrylate, octyl acrylate, decyl acrylate, isoamyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, t-butylcyclohexyl acrylate, caprolactone acrylate, cyclic trimethylolpropane formal acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and acryloylmorpholine In a preferred embodiment, the monofunctional polymerizable compound is selected from monoacrylates and vinyllactams, such as N-vinylcaprolactam.

The N-vinyllactam is preferably a compound represented by Formula (A):

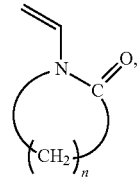

Formula (A)

wherein n denotes an integer of 2 to 6; n is preferably an integer of 3 to 5 from the viewpoint of flexibility after the ink composition is cured, adhesion to a substrate, and ready availability of starting materials, n is more preferably 3 or 5, and n is particularly preferably 5, which is N-vinylcaprolactam. N-vinylcaprolactam is preferable since it is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring. The compound represented by Formula (A) may be used singly or in a combination of two or more compounds.

For certain applications a limited amount or no monofunctional (meth)acrylates are employed. For example, when the substrate is a textile that is worn directly on the human skin it may give rise to skin sensitization. In such a case, the monomers and oligomers are preferably selected from a group comprising or consisting of vinyls, acrylamides, methacrylamides, vinyl carbonates, vinyl ethers, vinyl esters, vinyl carbamates, allyl ethers, allyl esters and their corresponding alkyne compounds. Particularly preferred are polymerizable compounds including an allyl ether group, vinyl carbonate group and alkyne group.

A polyfunctional polymerizable compound contains two, three or more polymerizable groups, preferably free radical polymerizable groups selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, the polyfunctional polymerizable compound is a duofunctional acrylate containing two polymerizable groups, namely two acrylate groups.

Preferred polyfunctional acrylates include triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerythritol tetraacrylate, pentaerythritolethoxy tetraacrylate, dipentaerythritol hexaacrylate, ditrimethylolpropane tetraacrylate, glycerolpropoxy triacrylate, and caprolactam modified dipentaerythritol hexaacrylate Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other polyfunctional acrylates include propoxylated glycerine triacrylate and propoxylated trimethylolpropane triacrylate, di-trimethylolpropane tetraacrylate, dipentaerythritol pentaacrylate, ethoxylated pentaerythritol tetraacrylate, methoxylated glycol acrylates and acrylate esters Preferred polyfunctional acrylates include dipropylene glycol diacrylate, tripropylene glycol diacrylate, 1,6-hexanediol diacrylate, cyclohexanone dimethanol diacrylate, polyethyleneglycol 200 diacrylate, 3-methyl 1,5-pentanediol diacrylate, pentaerythritol tetraacrylate, trimethylolpropane triacrylate and dipentaerythritol pentaacrylate.

The polyfunctional polymerizable compound may have two different polymerizable groups, such as a vinylether group and an acrylate group. Preferred vinylether acrylates are those disclosed in U.S. Pat. No. 6,310,115 (AGFA). A particularly preferred compound is 2-(2'-vinyloxyethoxy) ethyl acrylate (VEEA). Other suitable vinylether acrylates are those disclosed in columns 3 and 4 of U.S. 67/679,890 B (NIPPON SHOKUBAI).

Instead of difunctional or polyfunctional acrylates, also their methacrylate analogues may be used.

The UV curable composition or (inkjet) ink preferably contains at least one monomer comprising at least one vinyl ether group and at least one polymerizable group selected from the group consisting of an acrylate group and a methacrylate group, wherein this monomer is preferably represented by Formula (B):

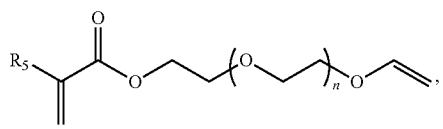

Formula (B)

wherein:
$R^5$ represents a hydrogen or a methyl group; and
n represents an integer from 0 to 4. Most preferably R5 represents hydrogen. Such a monomer postpones vitrification of the polymerizing network upon UV curing, thereby reducing the amount of migrateable monomers.

In a preferred embodiment, the at least one monomer comprising at least one vinyl ether group and at least one (meth)acrylate group is preferably selected from the group consisting of:

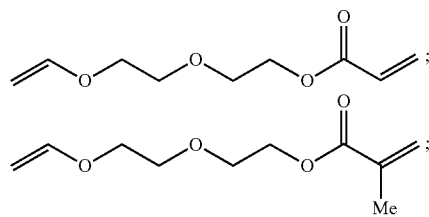

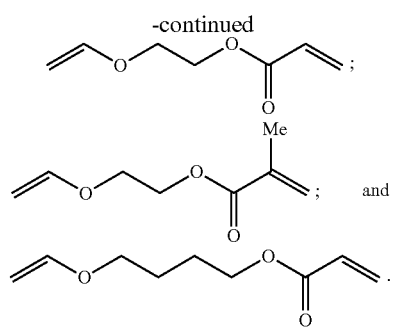

In the most preferred embodiment of the UV curable composition or (inkjet) ink, the at least one monomer comprising at least one vinyl ether group and at least one polymerizable group selected from the group consisting of an acrylate group and a methacrylate group is 2-(2'-vinyloxyethoxy)ethyl acrylate.

Other suitable vinylether (meth)acrylates are those disclosed in columns 3 and 4 of U.S. Pat. No. 6,767,980 (NIPPON SHOKUBAI).

A single compound or a mixture of vinylether acrylates may be used

The UV curable composition or (inkjet) ink according to the present invention contains at least 10 wt %, more preferably at least 20 wt % and most preferably at least 25 wt % of the monomer according to Formula (B), wherein all wt % are based on the total weight of the UV curable composition or (inkjet) ink.

In a particularly preferred embodiment, the UV curable inkjet ink includes a polymerizable composition consisting essentially of: a) 25 to 100 wt % of a monomer according to Formula (B), preferably 2-(2-vinyloxyethoxy)ethyl acrylate; b) 0 to 55 wt % of one or more polymerizable compounds X selected from the group consisting of monofunctional acrylates and difunctional acrylates; and c) 0 to 55 wt % of one or more polymerizable compounds Y selected from the group consisting of trifunctional acrylates, tetrafunctional acrylates, pentafunctional acrylates and hexafunctional acrylates, with the proviso that if the weight percentage of compounds X>24 wt %, then the weight percentage of compounds Y>1 wt %; and wherein all weight percentages are based upon the total weight of the polymerizable composition.

Colorants

The UV curable (inkjet) ink may contain a colorant. Colorants used in the curable inks may be dyes, pigments or a combination thereof. Organic and/or inorganic pigments may be used. The colorant is preferably a pigment or a polymeric dye, most preferably a colour pigment.

The pigments may be black, white, cyan, magenta, yellow, red, orange, violet, blue, green, brown, mixtures thereof, and the like. This colour pigment may be chosen from those disclosed by HERBST, Willy, et al Industrial Organic Pigments, Production, Properties, Applications. 3rd edition. Wiley-VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120,128, 138, 139, 150, 151, 154, 155, 175, 180, 181, 185, 194 and 213.

Particular preferred pigments are C.I. Pigment Red 17, 2, 23, 41, 48:1, 48:2, 49:1, 49:2, 52:1, 57:1, 88, 112, 122, 144, 146, 149, 170, 175, 176, 184, 185, 188, 202, 206, 207, 210, 216, 221, 248,251, 254, 255, 264, 266, 270 and 272.

Particular preferred pigments are C.I. Pigment Violet 19, 23, 32, and 37.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from BASF AG.

Carbon black is preferred as a black pigment. Suitable black pigments include carbon blacks such as Pigment Black 7 (e.g. Carbon Black MA8® from MITSUBISHI CHEMICAL), Regal 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP(89) 1 dated 13 Sep. 1989 published by the Council of Europe.

It is also possible to make mixtures of pigments. For example, in some inkjet ink application a neutral black inkjet ink is preferred and can be obtained e.g. by mixing a black pigment and a cyan pigment into the ink. Also pigments may be combined to enlarge the colour gamut of an ink set. The inkjet application may also require one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (Ill), cadmium red, ultramarine blue, prussian blue, chromium oxide green, cobalt green, amber, titanium black and synthetic iron black. However, care should be taken to prevent migration and extraction of heavy metals in food application. In the preferred embodiment no pigments are used which contain a heavy metal selected from the group consisting of arsenic, lead, mercury and cadmium. In a more preferred embodiment, no inorganic pigments are used in the inkjet ink with the exception of titanium oxide, and calcium carbonate.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness, but mainly also because very small pigment particles or individual pigment molecules thereof may still be extracted in food packaging applications.

The numeric average pigment particle size of pigment particles is best determined with a Brookhaven Instruments Particle Sizer B190plus based upon the principle of dynamic light scattering. The ink is then diluted, for example, with ethyl acetate to a pigment concentration of 0.002 wt %. The measurement settings of the B190plus are: 5 runs at 23° C., angle of 90°, wavelength of 635 nm and graphics=correction function.

In the case of a white UV curable ink, preferably a pigment with a refractive index greater than 1.60, preferably greater than 2.00, more preferably greater than 2.50 and most preferably greater than 2.60 is used. The white pigments may be employed singly or in combination.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

The numeric average particle diameter of the titanium oxide or other white pigments is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

The pigment is preferably used in a pigment dispersion used for preparing inkjet inks in an amount of 10 to 40 wt %, more preferably of 15 to 30 wt % based on the total weight of the pigment dispersion. In a curable inkjet ink the pigment is preferably present in an amount of 0.1 to 20 wt %, preferably 1 to 10 wt % based on the total weight of the inkjet ink.

Polymeric Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
DISPERBYK™ dispersants available from BYK CHEMIE GMBH;
SOLSPERSE™ dispersants available from LUBRIZOL;
TEGO™ DISPERS™ dispersants from EVONIK;
EDAPLAN™ dispersants from MONZING CHEMIE;
ETHACRYL™ dispersants from LYONDELL;
GANEX™ dispersants from ISP;
DISPEX™ and EFKA™ dispersants from BASF;
DISPONER™ dispersants from DEUCHEM.

Particularly preferred polymeric dispersants include Solsperse™ dispersants from LUBRIZOL, Efka™ dispersants from BASF and Disperbyk™ dispersants from BYK CHEMIE GMBH. Particularly preferred dispersants are Solsperse™ 32000, 35000 and 39000 dispersants from LUBRIZOL.

The polymeric dispersant is preferably used in an amount of 2 to 600 wt %, more preferably 5 to 200 wt %, most preferably 50 to 90 wt % based on the weight of the pigment.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from LUBRIZOL.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Polymerization Inhibitors

The UV curable composition or (inkjet) ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total UV curable composition or (inkjet) ink.

In a preferred embodiment, the polymerization inhibitor is a polymerizable inhibitor, preferably containing one or more acrylate groups for achieving good reactivity.

Surfactants

The UV curable composition or (inkjet) ink may contain at least one surfactant. The surfactant can be anionic, cationic, non-ionic, or zwitter-ionic and is preferably added in a total quantity less than 3 wt % based on the total weight of the ink and particularly in a total less than 1 wt % based on the total weight of the UV curable composition or (inkjet) ink.

Preferred surfactants are selected from fluoro surfactants (such as fluorinated hydrocarbons) and silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DM-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Preparation of UV Curable Inkjet Inks

The preparation of pigmented UV curable inkjet inks is well-known to the skilled person. Preferred methods of preparation are disclosed in paragraphs [0076] to [0085] of WO 2011/069943 (AGFA).

Inkjet Printing Methods

Another aspect of our invention is an inkjet printing method including the steps of: a) applying a UV curable composition as defined above on a substrate; and b) UV curing the UV curable composition on the substrate.

The UV curable composition may be applied as a primer or a varnish using inkjet or another printing technique, such as flexography, offset or screen printing, or a coating technique.

In a preferred embodiment of the inkjet printing method, the UV curable composition is applied by jetting a UV curable inkjet ink on the substrate.

The UV curable inkjet ink including a photoinitiator according to the invention is advantageously used for obtaining a printed interior decoration article. However, the UV curable inkjet ink is also suitable for other purposes such as printing on signs, displays and inkjet printed packaging for food or pharma.

In a preferred embodiment of the inkjet printing method, the UV curing is performed using UV LED curing.

A preferred inkjet printing method comprising the steps of: a) jetting a UV curable inkjet ink according to the invention on a substrate; and
  b) at least partially UV curing the UV curable inkjet ink on the substrate with UV LEDs, preferably UV LEDs having an emission wavelength larger than 360 nm.

In a preferred embodiment, the UV curable inkjet ink is printed via a single pass printing operation.

In a preferred embodiment, the UV curable inkjet ink is cured by UV-LED radiation within 5 seconds of being printed.

In a preferred embodiment, the total UV-dose used to cure the UV curable inkjet inks is less than 300 mJ/cm$^2$.

The inkjet printing method results in a printed article. A preferred printed article includes a substrate and the UV curable inkjet ink as described above. The substrate is preferably selected from the group consisting of plastic, metal, textiles, leather and glass.

Inkjet Printing Devices

The UV curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing, also known as multi-pass printing, is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The UV curable compositions, inks or inkjet inks according to the present invention are cured by exposure to ultraviolet radiation.

In inkjet printing, the curing means may be arranged in combination with the print head of the inkjet printer, travelling therewith so that the curing radiation is applied very shortly after jetting. Such rapid curing is sometimes referred to as "pin curing" and used for enhancing image quality by controlling the dot size. Preferably such curing means consists of one or more UV LEDs. In such an arrangement, it can be difficult to provide other types of curing means that are small enough to be connected to and travelling with the print head. Therefore, a static fixed radiation source may be employed, e.g. a source of curing UV-light, connected to the radiation source by means of flexible radiation conductive means such as a fibre optic bundle or an internally reflective flexible tube. Alternatively, the actinic radiation may be supplied from a fixed source to the radiation head by an arrangement of mirrors including a mirror upon the print head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. 002), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

INDUSTRIAL APPLICABILITY

There is no real limitation on the type of substrate. The substrates may have ceramic, metallic, wood, paper or polymeric surfaces for printing. The substrate may also be primed, e.g. by a white primer or ink.

The UV curable compositions, inks or inkjet inks including a photoinitiator according to the invention are advantageously used for obtaining a printed interior decoration article.

However, the UV curable compositions, inks or inkjet inks are also suitable for other purposes such as printing on signs, displays and (inkjet) printed packaging for food or pharma.

Food packaging is understood to include also packaging for liquids and drinks like milk, water, coke, beer, vegetable oil and the like.

The invention is advantageously used for providing food packaging, especially "primary" food packaging. Primary food packaging is the material that first envelops the product and holds it. This usually is the smallest unit of distribution or use and is the package which is in direct contact with the contents. Of course, for reasons of food safety, the UV curable compositions and inkjet inks may also be used for secondary and tertiary packaging. Secondary packaging is outside the primary packaging, perhaps used to group primary packages together. Tertiary packaging is used for bulk handling, warehouse storage and transport shipping. The most common form of tertiary packaging is a palletized unit load that packs tightly into containers.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

There is no restriction on the shape of the substrate. It can be a flat sheet, such a paper sheet or a polymeric film or it can be a three dimensional object like furniture, lamps, and other interior decoration articles suitable for printing.

In a preferred embodiment, the substrate is a decorated panel selected from the group consisting of kitchen panels, flooring panels, furniture panels, ceiling panels and wall panels. Preferred decorative panels are known as LVT (Luxury Vinyl Tile).

A preferred decoration is a wood pattern or wood grain. Preferred methods of inkjet printing according to the present invention include:

decoration printing of wood patterns on non-decorated substrates for improving the decorative function, e.g. in combination with natural wood decoration or in combination with other types of printed decoration materials (e.g. laminates on the basis of printed deco paper);

printing of furniture side bands, preferably made of ABS;

printing of wood patterns on non-wood substrates (optionally in combination with natural wood);

printing of wood patterns on cheap substrates (fibreboard, . . . );

printing of wood patterns on durable materials (metals, MDF, HDF panels); and printing of wood patterns on floors, furniture materials, ceilings, wall decoration, but also on objects (e.g. light switches) in order to have a non-disturbed wood decoration effect.

EXAMPLES

Materials

TPO-L is ethyl phenyl(2,4,6-trimethylbenzoyl)phosphinate available as Omnirad™ TPO-L from IGM Resins BV.

THIOXANTHON-1 is a polymerizable thioxanthone having the chemical structure TX-1 and being a 50 w % solution in VEEA. THIOXANTHON-1 can be prepared according to Example 1 of EP 2684876 A (AGFA).

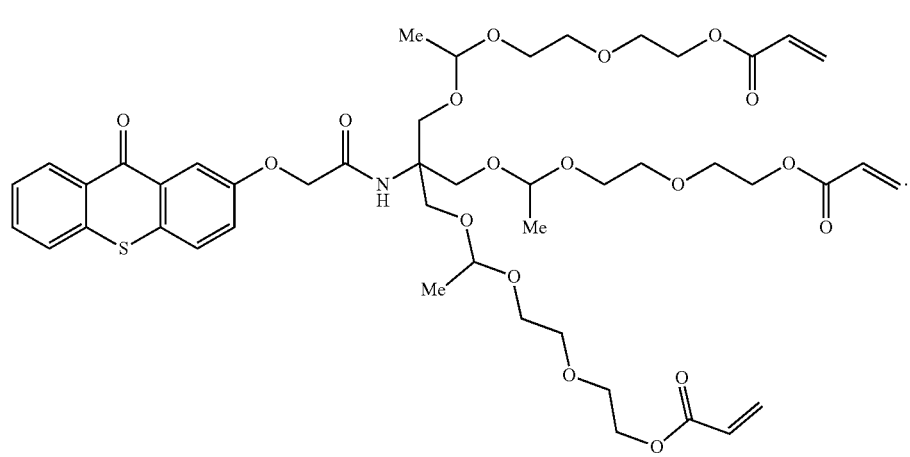

TX-1

VEEA is 2-(2'-vinyloxyethoxy)ethyl acrylate, a difunctional monomer available from NIPPON SHOKUBAI, Japan.

GAB1 is a polymeric 4-dimethylaminobenzoic acid derivative available as GENOPOL™ AB1 from Rahn.

INHIB is a mixture forming a polymerization inhibitor having a composition according to Table 3.

TABLE 3

| Component | wt % |
|---|---|
| VEEA | 82.4 |
| p-methoxyphenol | 4.0 |
| Butylated hydroxytoluene (BHT) | 10.0 |
| Cupferron™ AL | 3.6 |

Cupferron™ AL is aluminum N-nitrosophenylhydroxylamine from WAKO CHEMICALS LTD.

PET175 is a 175 μm thick unsubbed polyethylene terephthalate sheet available as Astera™ type UR175.334 from AGFA-GEVAERT NV.

Methods

1. TLC

The molecular mass was determined using TLC-MS, according to the following procedure. A TLC was run under circumstances given in the synthetic examples. The TLC was analyzed using a CAMAG TLC-MS interface coupled to an AmaZon SL mass spectrometer (supplied by Bruker Daltonics) via an Agilent 1100 HPLC pump. First a blank spectrum was taken by eluting a spot on the TLC plate where no compounds are present with a 0.01 molar solution of ammonium acetate in methanol. A second spectrum of the compound to be analyzed was taken by eluting the spot of the compound under consideration with a 0.01 molar solution of ammonium acetate in methanol. The first spectrum was subtracted from the second spectrum, giving the spectrum of the compound to be analyzed.

2. Viscosity

The viscosity of the UV curable compositions was measured at 45° C. and at a shear rate of 1,000 s$^{-1}$ using a Rotovisco™ RV1 viscometer from HAAKE.

Example 1

This example illustrates the synthesis of acyl phosphine oxide initiator wherein the acyl group is a 2,4,6-trimethyl benzoyl group substituted in position 3 by an oxalylamide group.

Synthesis

The synthesis is performed in steps 1 to 6.

Step 1: synthesis of compound C-2

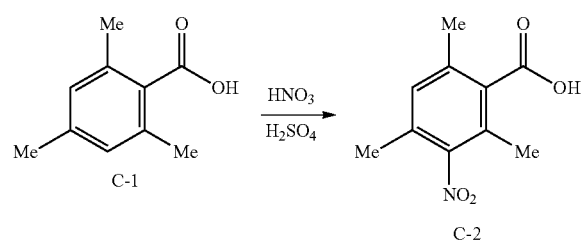

100 g (0.6 mol) of 2,4,6-trimethyl-benzoic acid (compound C-1) was added to 2.79 kg nitric acid (65 w %). 116.6 ml concentrated sulfuric acid was added and the mixture was stirred for 18 hours at room temperature. The mixture was added to 1.5 kg of an ice/water mixture. 2,4,6-trimethyl-3-nitro-benzoic acid (compound C-2) precipitated from the medium. Compound C-2 was isolated by filtration and washed to neutral pH with water. The isolated compound C-2 was dried to constant weight. 112 g 2,4,6-trimethyl-3-nitro-benzoic acid (yield: 89%) was isolated (m.p. 194° C. (lit. 184° C. Chemische Berichte, V120(5), P803-9 (1987))).

Step 2: synthesis of compound C-3

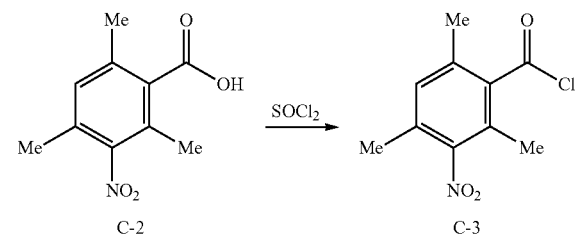

112 g (0.53 mol) of 2,4,6-trimethyl-3-nitro-benzoic acid was suspended in 1.2 l toluene. 63.28 g (0.8 mol) pyridine was added followed by the addition of 95.18 g (0.8 mol) thionyl chloride over 30 minutes. The temperature rose to 36° C. during the addition. The reaction was allowed to continue for an hour at room temperature. The precipitated salts were removed by filtration and the solvent was evaporated under reduced pressure. 500 ml methyl t.butyl ether was added and the mixture was evaporated again under reduced pressure. This was repeated for a second time. 119 g of 2,4,6-trimethyl-3-nitro-benzoyl chloride (yield: 99%) was isolated. The compound C-3 was used in the next step without further purification.

Step 3: Synthesis of Compound 0-4

The compound 0-4 is (3-nitro-2,4,6-trimethyl-phenyl)-[ethoxy(phenyl)phosphoryl]methanone.

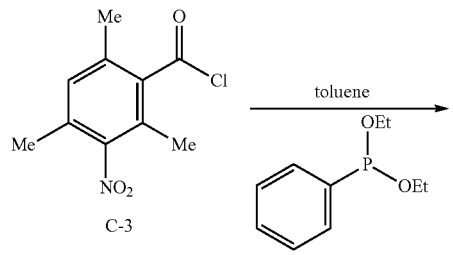

103.5 g (0.522 mol) diethyl-phenylphosphonite was dissolved in 500 ml toluene. The solution was heated to 80° C. 119 g (0.52 mol) of compound C-3 was dissolved in 250 ml toluene and added to the mixture over 15 minutes. The reaction was allowed to continue for three hours at 80° C. The reaction was allowed to cool down to room temperature and the mixture was extracted twice with 350 ml of saturated NaHCO$_3$-solution and twice with 400 ml brine. The organic fraction was isolated, dried over Na$_2$SO$_4$ and evaporated under reduced pressure. The crude compound C-4 was purified by preparative column chromatography on a Graceresolve RS80 column, using methylene chloride as eluent. 88 g of compound 0-4 (yield: 47%) was isolated. (TLC analysis on TLC Silica gel 60F$_{254}$ supplied by Merck, eluent methylene chloride/ethyl acetate 90/10:R$_f$:0.49). The molecular mass was confirmed using the TLC-MS methodology described above.

Step 4: Synthesis of Compound C-5

The compound C-5 is (3-amino-2,4,6-trimethyl-phenyl)-[ethoxy(phenyl)phosphoryl]methanone

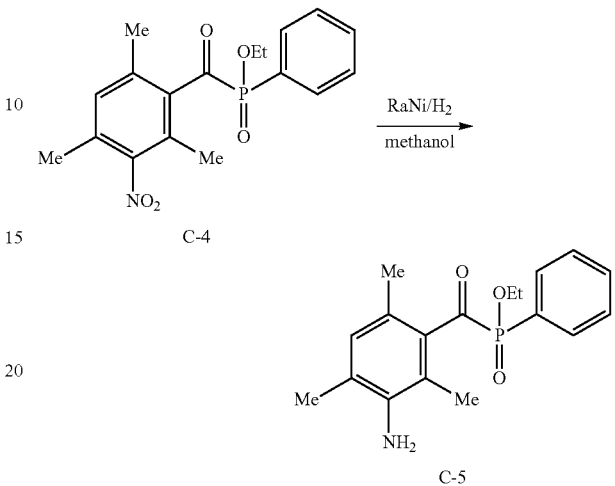

24.3 g (70 mmol) of compound C-4 was dissolved in 200 g methanol. 1 g of RaNi was washed three times with methanol and added to the reaction mixture. Compound C-4 was hydrogenated at 30° C. and 50 bar hydrogen pressure. Upon complete hydrogenation, the reaction mixture was allowed to cool down to room temperature and the RaNi was removed by filtration. The solvent was removed under reduced pressure and 21.6 g of compound C-5 was isolated (yield: 97.3%). Compound C-5 was used without further purification.

Step 5: Synthesis of Compound C-6

The compound C-6 is ethyl 2-[3-[ethoxy(phenyl)phosphoryl]carbonyl-2,4,6-trimethyl-anilino]-2-oxo-acetate.

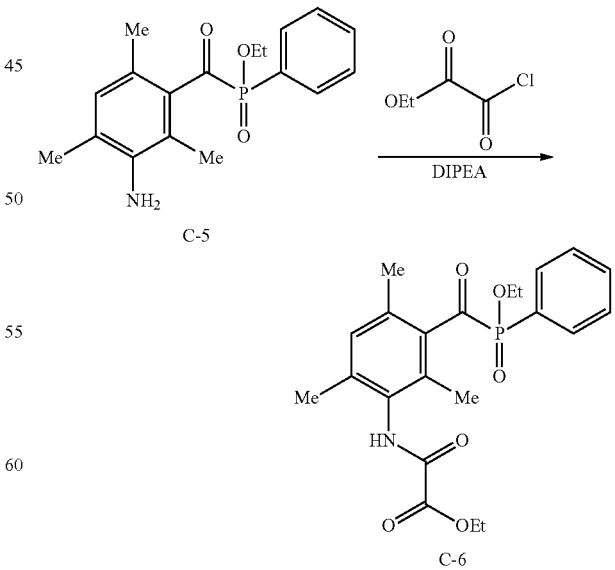

19.1 g (57.6 mmol) of Compound C-5 was dissolved in 15M ml methylene chloride. 8.19 g (63.4 mmol) diisopropyl ethyl amine was added and the mixture was cooled to 0° C. A solution of 8.65 g (63.4 mmol) ethyl oxalyl chloride in 30 ml methylene chloride was added over 45 minutes while keeping the temperature at 0° C. The reaction mixture was allowed to continue for 16 hours at room temperature. The mixture was extracted twice with 100 ml of a 2N hydrochloric acid solution, twice with 100 ml of a saturated NaHCO$_3$ solution and 100 ml water. The organic fraction was dried over Na$_2$SO$_4$ and evaporated under reduced pressure. The crude compound C-6 was used without further purification.

Step 6: Synthesis of Compound OXA-1

The compound OXA-1 is N-butyl-N'-[3-[ethoxy(phenyl)phosphoryl]carbonyl-2,4,6-trimethyl-phenyl]oxamide.

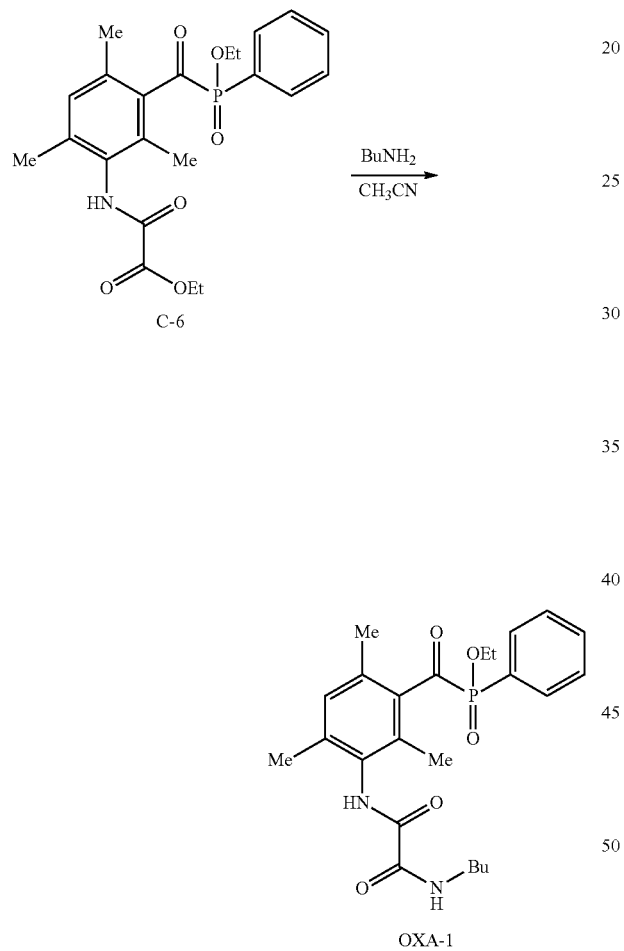

10 g (theoretically 23 mmol) of compound C-6 was dissolved in 60 ml acetonitrile. 8.41 g (0.115 mol) butyl amine was added and the mixture was refluxed for four hours. The solvent was removed under reduced pressure. The compound OXA-1 was purified using preparative column chromatography on ProChrom LC80 column, using Kromasil C18 100 Å 10 μm as stationary phase and methanol/0.2 M ammonium acetate 70/30 as eluent. 0.87 g of compound OXA-1 was isolated (TLC-analysis on Reveleris RP C18 TLC plates, supplied by Grace, eluent methanol/1M NaCl, R$_f$:0.29). The molecular mass was confirmed using the TLC-MS methodology described above.

Example 2

This example illustrates the synthesis of the acyl phosphine oxide initiator OXA-4.

Synthesis

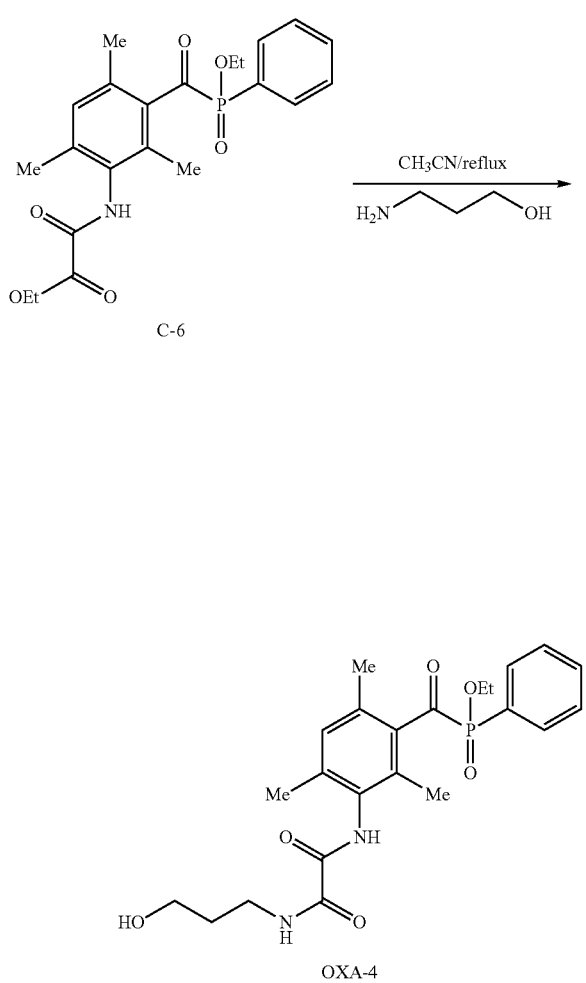

3.02 g (7 mmol) of the compound 0-6 prepared in synthesis step 5 of Example 1 and 0.75 g (10 mmol) 3-amino-propanol were dissolved in 20 ml acetonitrile. The mixture was refluxed for 90 minutes. After 90 minutes, the mixture was allowed to cool down to room temperature and the solvent was removed under reduced pressure. The crude OXA-4 was purified by preparative column chromatography on a GraceResolve column using ethyl acetate as eluent. 2 g (yield: 62.5%) of OXA-4 was isolated (TLC analysis on Reveleris RP C18 TLC plates, supplied by Grace, eluent methanol/1M NaCl 70/30:R$_f$:0.48). The molecular mass was confirmed using the TLC-MS methodology described above.

Example 3

This example illustrates the synthesis of a polymerizable acyl phosphine oxide initiator in accordance with the invention.

Synthesis

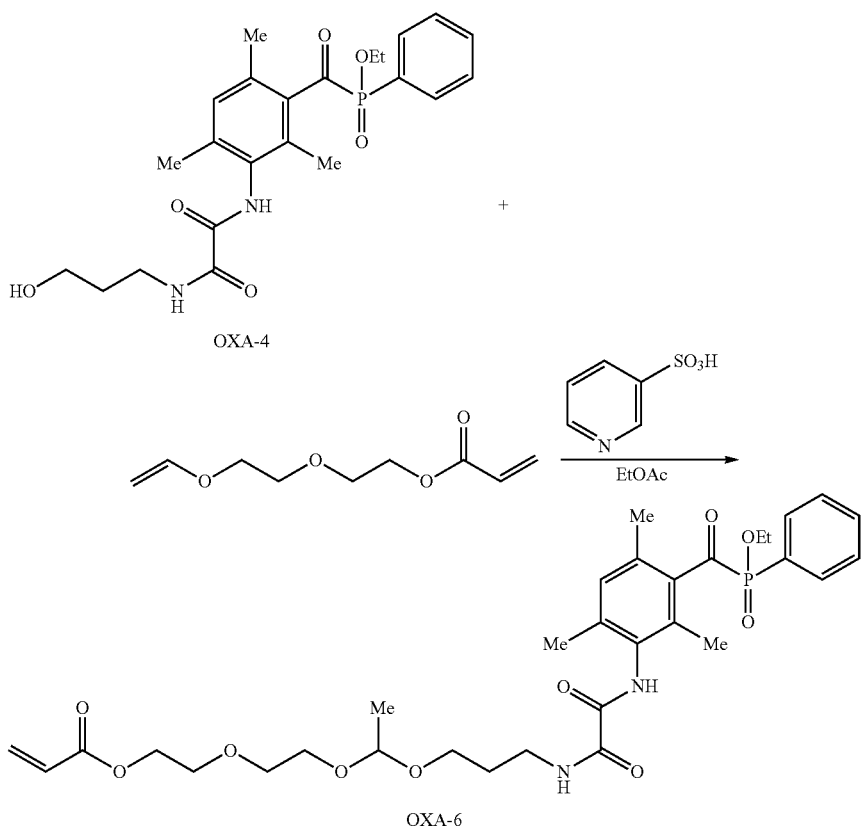

2.5 g (5.43 mol) of compound OXA-4 prepared in Example 2 was dissolved in 10 ml ethyl acetate. 24 mg BHT, 1.112 g (5.97 mmol) 2-(2-vinyloxyethoxy)ethyl acrylate and 87 mg (0.55 mmol) pyridine-3-sulfonic acid were added. The reaction mixture was heated to 70° C. and the reaction was allowed to continue for 16 hours. An additional 0.1 g 2-(2-vinyloxyethoxy)ethyl acrylate and 9 mg pyridine-3-sulfonic acid were added and the reaction was allowed to continue for an additional 5 hours. The reaction mixture was allowed to cool down to room temperature and the catalyst was removed by filtration. The solvent was removed under reduced pressure and compound OXA-6 was purified by preparative column chromatography on a GraceResolve column, using methylene chloride/ethyl acetate 1/1 as eluent. 1.9 g (yield: 54%) of OXA-6 was isolated. (TLC analysis on Reveleris RP 018 TLC plates, supplied by Grace, eluent methanol/1M NaCl 70/30:$R_f$:0.28). The molecular mass was confirmed using the TLC-MS methodology described above.

Example 4

This example illustrates the synthesis of a multifunctional acyl phosphine oxide initiator in accordance with the invention.

Synthesis

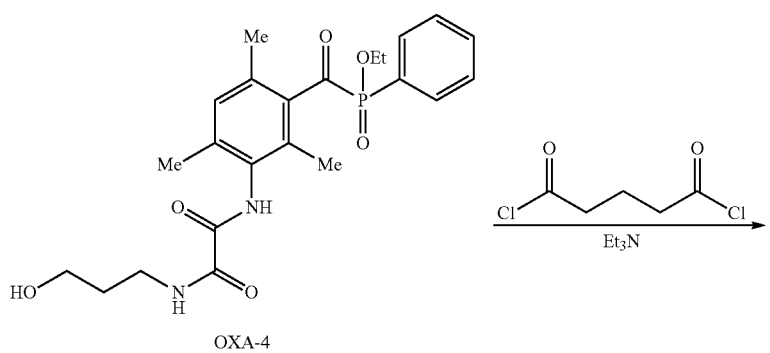

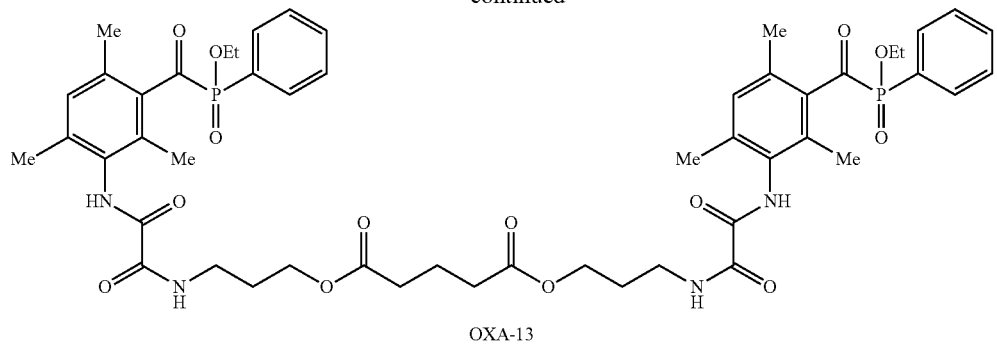

OXA-13

1.842 g (4 mmol) of the compound OXA-4 as prepared in Example 2 and 0.409 g (4.04 mmol) triethyl amine were dissolved in 40 ml isopropyl acetate. A solution of 0.348 g (2 mmol) glutaryl chloride in 10 ml isopropyl acetate was added dropwise. The reaction was allowed to continue for three hours at room temperature followed by reflux for 90 minutes. The precipitated salts were removed by filtration and the solvent was removed under reduced pressure. OXA-13 was purified by preparative column chromatography on a GraceResolve column, using ethyl acetate as eluent. 0.720 g (yield: 35.4%) of OXA-13 was isolated (TLC analysis on Reveleris RP 018 TLC plates, supplied by Grace, eluent methanol/1M NaCl 75/25:$R_f$:0.24). The molecular mass was confirmed using the TLC-MS methodology described above.

Example 5

This example illustrates the synthesis of an acyl phosphine oxide initiator in accordance with the invention, wherein the acyl group is a 2,4,6-trimethyl benzoyl group substituted in position 3 by an urea group
Synthesis

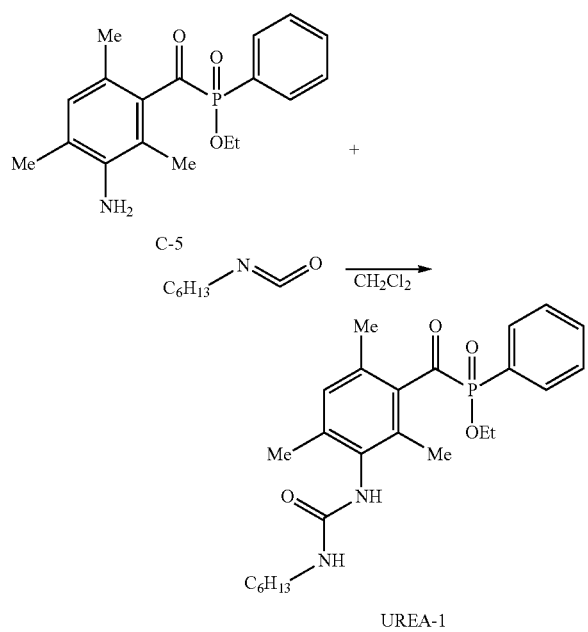

UREA-1

6.62 g (20 mmol) of compound C-5 as prepared in Example 1 was dissolved in 60 ml methylene chloride. A solution of 3.8 g (30 mmol) n.-hexyl isocyanate in 20 ml methylene chloride was added and the reaction was allowed to continue for three hours at room temperature. The solvent was removed under reduced pressure and UREA-1 was isolated by preparative column chromatography on a GraceResolv RS80 column using a gradient elution from 100% methylene chloride to 100% ethyl acetate. 5 g (y: 54%) of UREA-1 was isolated (TLC analysis on TLC Silicagel 60 $F_{254}$, supplied by Merck, eluent 100% ethyl acetate, $R_f$:027). UREA-1 was analyzed using $^1$H-NMR spectroscopy (DMSO d6).

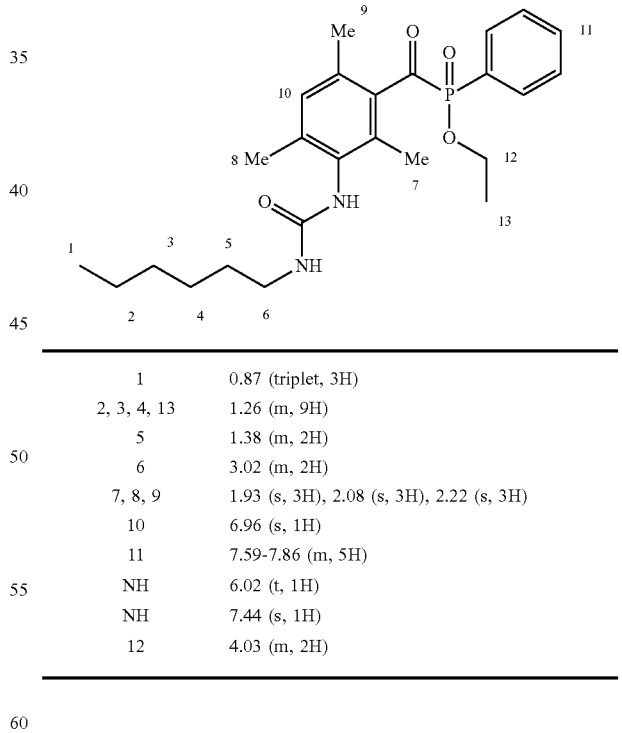

| | |
|---|---|
| 1 | 0.87 (triplet, 3H) |
| 2, 3, 4, 13 | 1.26 (m, 9H) |
| 5 | 1.38 (m, 2H) |
| 6 | 3.02 (m, 2H) |
| 7, 8, 9 | 1.93 (s, 3H), 2.08 (s, 3H), 2.22 (s, 3H) |
| 10 | 6.96 (s, 1H) |
| 11 | 7.59-7.86 (m, 5H) |
| NH | 6.02 (t, 1H) |
| NH | 7.44 (s, 1H) |
| 12 | 4.03 (m, 2H) |

Example 6

This example illustrates the synthesis of a polymerizable acyl phosphine oxide initiator in accordance with the invention, wherein the acyl group is a 2,4,6-trimethyl benzoyl group substituted in position 3 by an urea group Synthesis

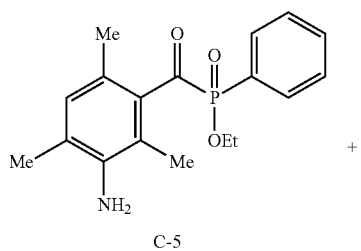

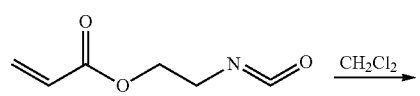

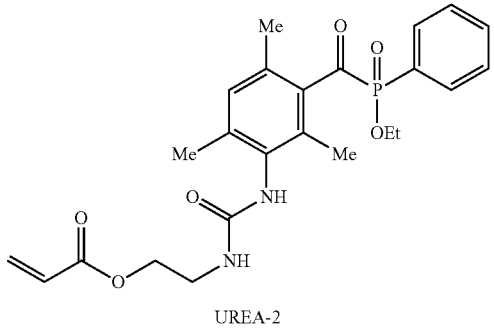

UREA-2

6.62 g (20 mol) of compound C-5 as prepared in Example 1 was dissolved in 65 ml methylene chloride. A solution of 2.96 g (21 mmol) 2-acryloyloxyethyl acrylate was added and the reaction was allowed to continue for three hours at room temperature. An additional 1.48 g (10.5 mmol) 2-acryloyloxyethyl acrylate was added and the reaction was allowed to continue at room temperature for 16 hours. The solvent was removed under reduced pressure. UREA-2 was isolated by preparative column chromatography on a Prochrom LC80 column using Kromasil 018 100 Å 10 μm as stationary phase and methanol/0.2 M ammonium acetate 60/40 as eluent. 3.87 g (y: 41%) of UREA-2 was isolated (TLC analysis on Reveleris RP 018 TLC plates, supplied by Grace, methanol/1M NaCl 60/40 as eluent, $R_f$:0.16). UREA-2 was analyzed using $^1$H-NMR spectroscopy (DMSO d6, 50 μl trifluoroacetic acid in 0.7 ml DMSO d6).

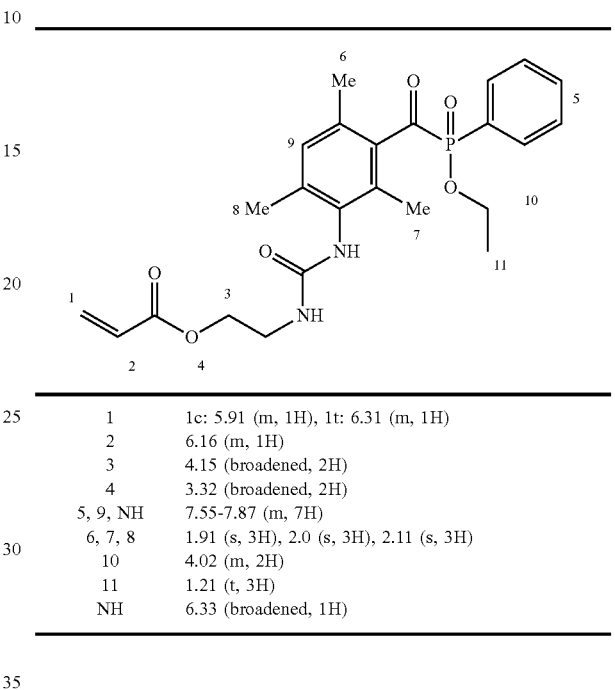

| | |
|---|---|
| 1 | 1c: 5.91 (m, 1H), 1t: 6.31 (m, 1H) |
| 2 | 6.16 (m, 1H) |
| 3 | 4.15 (broadened, 2H) |
| 4 | 3.32 (broadened, 2H) |
| 5, 9, NH | 7.55-7.87 (m, 7H) |
| 6, 7, 8 | 1.91 (s, 3H), 2.0 (s, 3H), 2.11 (s, 3H) |
| 10 | 4.02 (m, 2H) |
| 11 | 1.21 (t, 3H) |
| NH | 6.33 (broadened, 1H) |

Example 7

This example illustrates the synthesis of a multifunctional acyl phosphine oxide initiator in accordance with the invention, wherein the acyl group is a 2,4,6-trimethyl benzoyl group substituted in position 3 by an urea group Synthesis

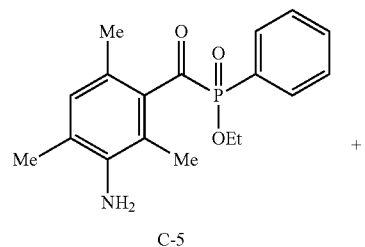

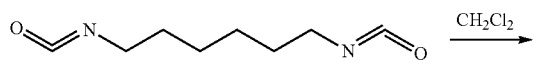

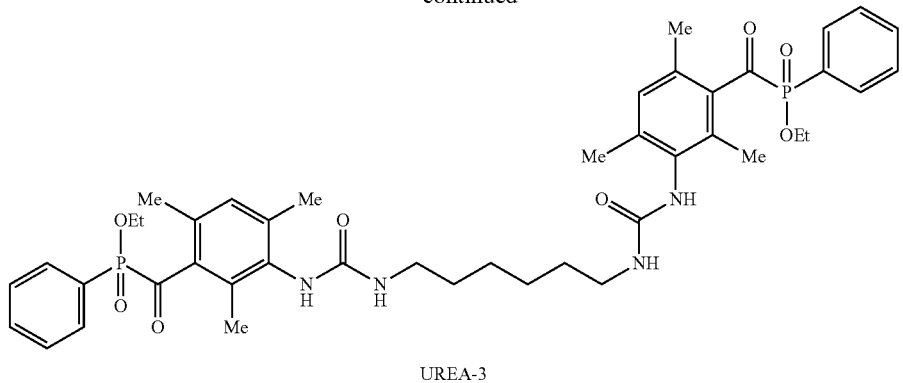

UREA-3

7.28 g (22 mmol) of compound C-5 as prepared in Example 1 was dissolved in 60 ml methylene chloride. A solution of 1.68 g (10 mmol) hexamethylene diisocyanate in 20 ml methylene chloride was added and the reaction was allowed to continue at room temperature for 24 hours. The solvent was removed under reduced pressure and UREA-3 was isolated by preparative column chromatography on a Prochrom LC80 column using Kromasil O18 100 Å 10 μm as stationary phase and methanol/0.2 M ammonium acetate 70/30 as eluent. 1.94 g (y: 21%) of UREA-3 was isolated (TLC analysis on Reveleris RP C18 TLC plates, supplied by Grace, methanol/1M NaCl 80/20 as eluent, $R_f$:0.42). UREA-2 was analyzed using $^1$H-NMR spectroscopy (DMSO d6, 50 μl trifluoroacetic acid in 0.7 ml DMSO d6).

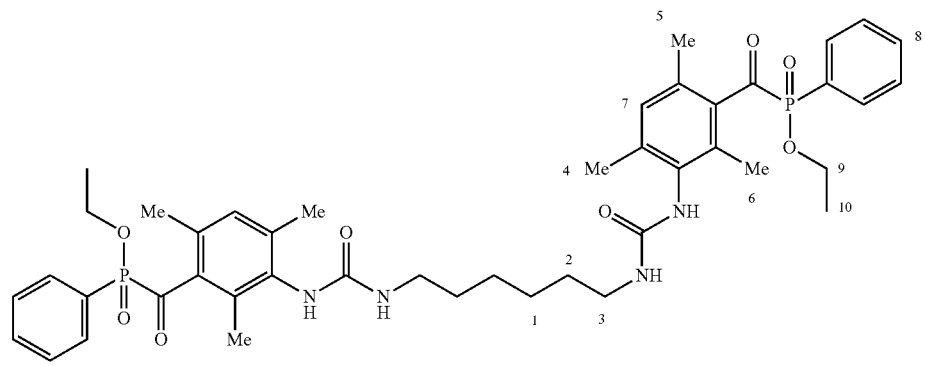 [SMILES: CCOP(=O)(C(=O)c1c(C)cc(C)c(NC(=O)NCCCCCCNC(=O)Nc2c(C)cc(C)c(C(=O)P(=O)(OCC)c3ccccc3)c2C)c1C)c1ccccc1]

| | |
|---|---|
| 1 | 1.27 (m, 4H) |
| 2 | 1.42 (m, 4H) |
| 3 | 3.04 |
| 4, 5, 6 | 1.93 (s, 6H), 2.08 (s, 6H), 2.22 (s, 6H) |
| 7 | 6.97 (s, 2H) |
| 8 | 7.57-7.87 |
| NH | 6.04 (broadened, 2H) |
| NH | 7.44 (s, 2H) |
| 9 | 4.05 (m, 4H) |
| 10 | 1.24 (t, 6H) |

Example 8

This Example illustrates the reduction in bad smell from UV cured UV curable compositions containing an acyl phosphine oxide initiator in accordance with the invention.
Preparation of UV Curable Compositions
The comparative example COMP-1 and the inventive examples INV-1 to INV-7 were prepared according Table 4. The weight % (wt %) were based on the total weight of the UV curable compositions.

TABLE 4

| wt % of | COMP-1 | INV-1 | INV-2 | INV-3 | INV-4 | INV-5 | INV-6 | INV-7 |
|---|---|---|---|---|---|---|---|---|
| TPO-L | 7 | — | — | — | — | — | — | — |
| OXA-1 | — | 10 | — | — | — | — | — | — |
| OXA-4 | — | — | 10 | — | — | — | — | — |
| OXA-6 | — | — | — | 14 | — | — | — | — |
| OXA-13 | — | — | — | — | 11 | — | — | — |
| UREA-1 | — | — | — | — | — | 10 | — | — |
| UREA-2 | — | — | — | — | — | — | 8.7 | — |
| UREA-3 | — | — | — | — | — | — | — | 9 |
| EtOH | — | — | — | — | — | 20 | — | 20 |
| THIO-XANTHON-1 | 20 | 20 | 20 | 20 | 20 | 20 | 20 | 20 |
| GAB1 | 10 | 10 | 10 | 10 | 10 | 10 | 10 | 10 |
| VEEA | 62 | 59 | 59 | 55 | 58 | 39 | 64.3 | 40 |
| INHIB | 1 | 1 | 1 | 1 | 1 | 1 | 1 | 1 |

All the UV curable compositions had a viscosity of less than 30 mPa·s a 45° C., thus making them suitable as UV curable inkjet inks.

Evaluation and Results

The comparative example COMP-1 and the inventive examples INV-1 to INV-7 were coated on a PET175 substrate using a bar coater and a 10 μm wired bar. All coated samples were cured using a Fusion DRSE-120 conveyer, equipped with a Fusion VPS/1600 lamp (D-bulb). The samples were cured three times at a belt speed of 20 m/min at full power of the lamp. All samples were fully cured.

The samples were evaluated for smell by five persons, scoring each sample from 0 for complete odourless to 5 for a very persistent smell. The five scores were averaged and the average smell score is shown in Table 5.

TABLE 5

| Sample | Averaged smell score |
|---|---|
| COMP-1 | 4 |
| INV-1 | 1.5 |
| INV-2 | 1 |
| INV-3 | 1 |
| INV-4 | 1 |
| INV-5 | 1 |
| INV-6 | 1 |
| INV-7 | 1 |

From Table 5, it becomes apparent that the photoinitiators according to the present invention clearly improve the background smell of the cured samples. It was also observed that the addition of 20 wt % of ethanol in the UV curable compositions INV-5 and INV-7 did not affect the curing.

The invention claimed is:

1. An acyl phosphine oxide initiator comprising an acyl group selected from the group consisting of a benzoyl group substituted in position 3 by either a urea group or an oxalylamide group; a 2,6-dimethyl benzoyl group substituted in position 3 by either a urea group or an oxalylamide group; a 2,6-dimethoxy benzoyl group substituted in position 3 by either a urea group or an oxalylamide group; a 2,4,6-trimethyl benzoyl group substituted in position 3 by either a urea group or an oxalylamide group; and a 2,4,6-trimethoxybenzoyl group substituted in position 3 by either a urea group or an oxalylamide group, wherein if the acyl group comprises a urea group, then the acyl phosphine oxide initiator does not comprise a thiol group, and wherein the acyl phosphine oxide initiator is of Formula (I):

Formula (I)

wherein
R1 is of Formula (II):

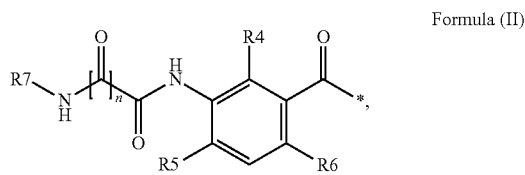

Formula (II)

wherein
* is the point of attachment to Formula (I);
R4, R5 and R6 independently are selected from the group consisting of hydrogen, methyl, and methoxy;
R7 and R8 independently are selected from the group consisting of hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted aralkyl group, a substituted or unsubstituted alkaryl group, a substituted or unsubstituted heteroaryl group, a (meth)acrylate containing group, and a (meth)acrylamide containing group; and
n is an integer having a value of 0 or 1;
R2 is selected from the group consisting of a substituted or unsubstituted aryl group, a substituted or unsubstituted heteroaryl group, and OR8; and
R3 is selected from the group consisting of a substituted and unsubstituted aryl group, a substituted or unsubstituted heteroaryl group, or is of Formula (II).

2. An acyl phosphine oxide initiator comprising an acyl group selected from the group consisting of a benzoyl group substituted in position 3 by either a urea group or an oxalylamide group; a 2,6-dimethyl benzoyl group substituted in position 3 by either a urea group or an oxalylamide group; a 2,6-dimethoxy benzoyl group substituted in position 3 by either a urea group or an oxalylamide group; a 2,4,6-trimethyl benzoyl group substituted in position 3 by either a urea group or an oxalylamide group; and a 2,4,6-trimethoxybenzoyl group substituted in position 3 by either a urea group or an oxalylamide group,
wherein if the acyl group comprises a urea group, then the acyl phosphine oxide initiator does not comprise a thiol group, and
wherein the acyl phosphine oxide initiator is of Formula (III):

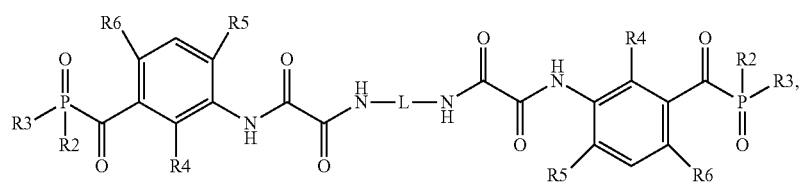

Formula (III)

wherein
each R2 is selected from the group consisting of a substituted or unsubstituted aryl group, a substituted or unsubstituted heteroaryl group, and OR8; and
each R3 is selected from the group consisting of a substituted and substituted aryl group, a substituted or unsubstituted heteroaryl group, or is of Formula (II);

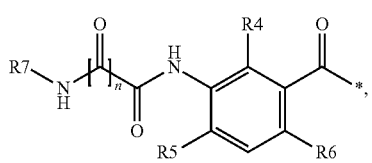

Formula (II)

wherein
* is the point of attachment to the phosphine oxide group in Formula (III);
each R4, R5 and R6 independently is hydrogen, methyl, or methoxy;
each R7 and R8 independently is hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted aralkyl group, a substituted or unsubstituted alkaryl group, a substituted or unsubstituted heteroaryl group, a (meth)acrylate containing group, or a (meth)acrylamide containing group;
L is a divalent linking group comprising 2 to 60 carbon atoms; and
n is an integer having a value of 0 or 1.

3. The acyl phosphine oxide initiator of claim 1, wherein R4, R5, and R6 are methyl.

4. The acyl phosphine oxide initiator of claim 2, wherein each R3 is of Formula (II) and the linking group L is an alkylene group or an alkoxylated group.

5. The acyl phosphine oxide initiator of claim 2, wherein the linking group L comprises a moiety selected from the group consisting of:

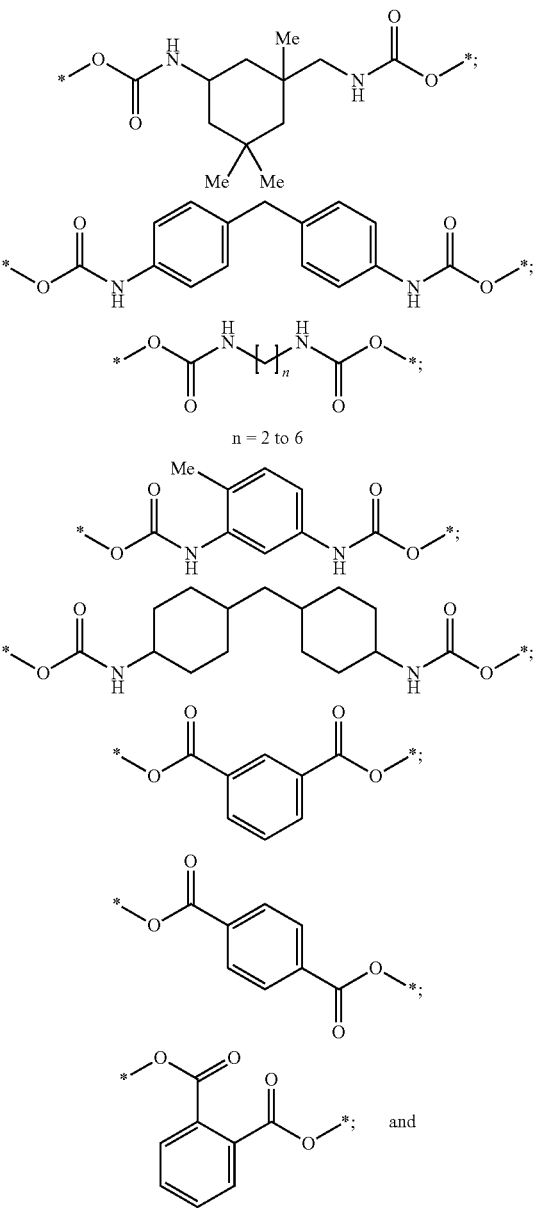

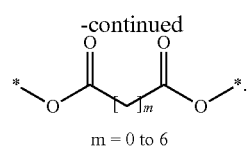
6. An acylphosphine oxide initiator selected from the group consisting of:
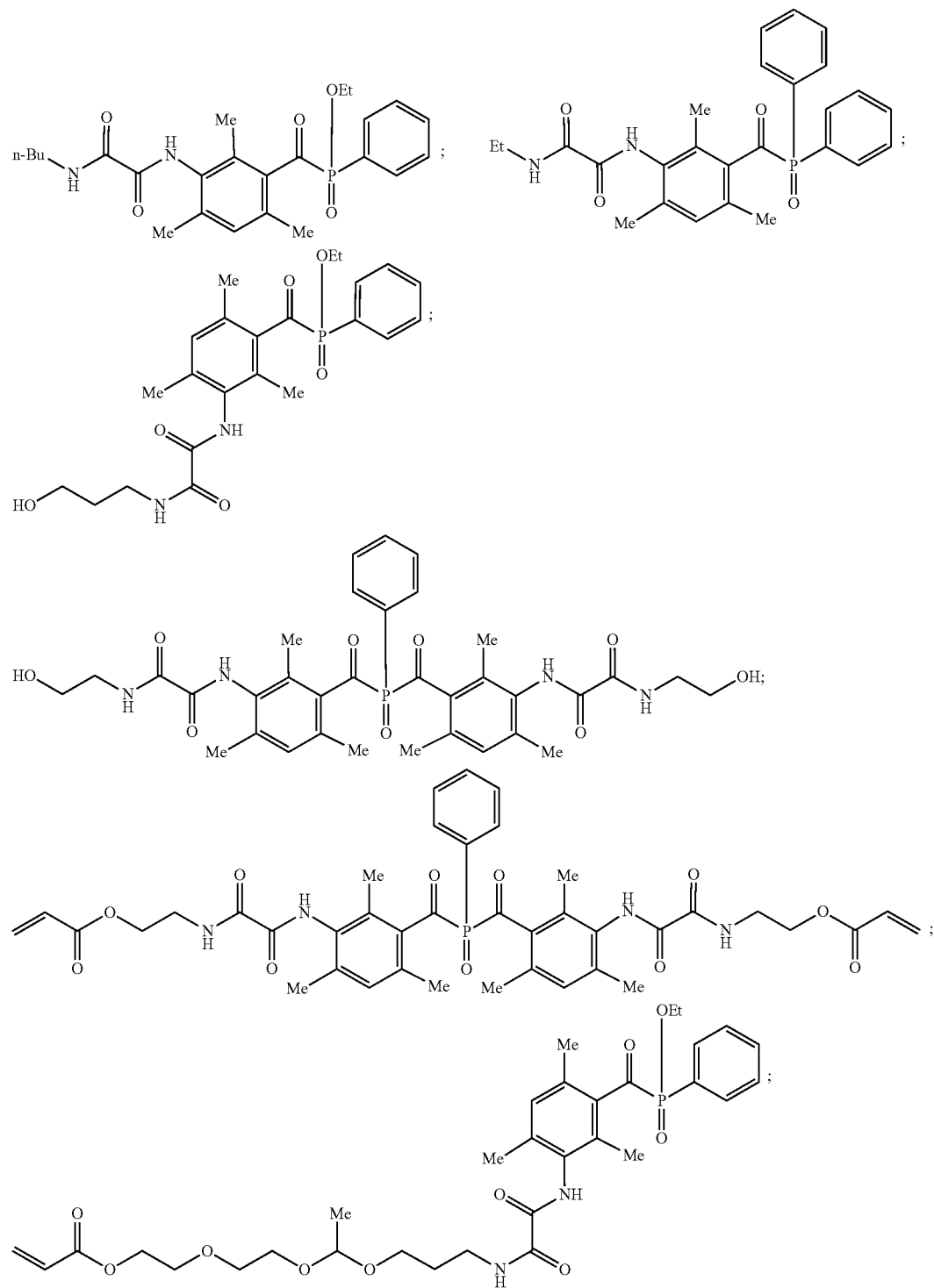

-continued
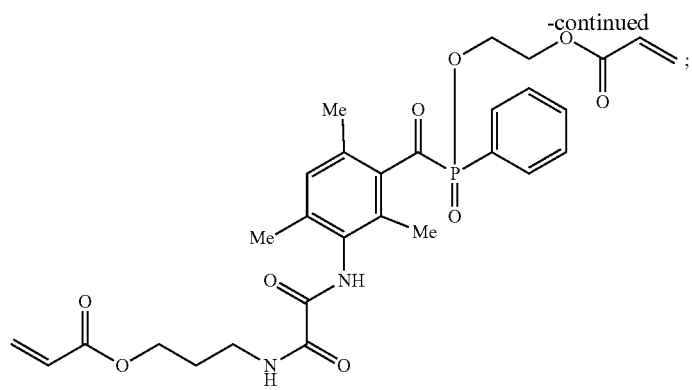
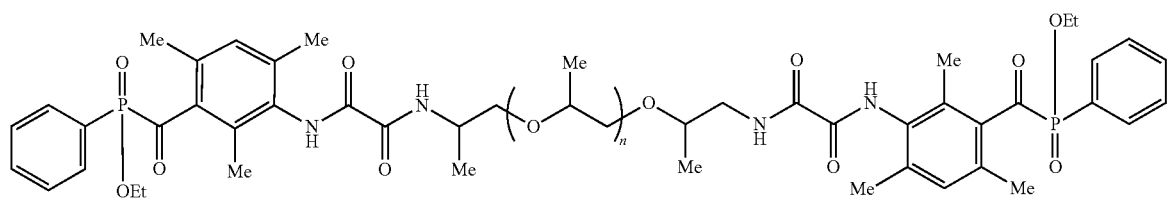
with n=1 to 20;
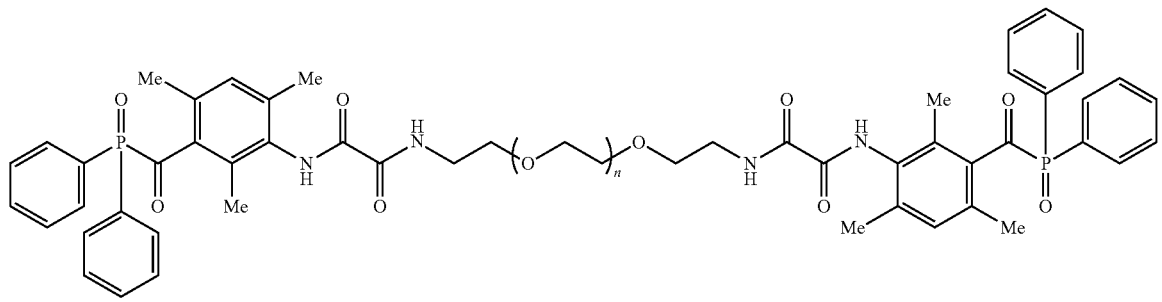
with n=1 to 20;
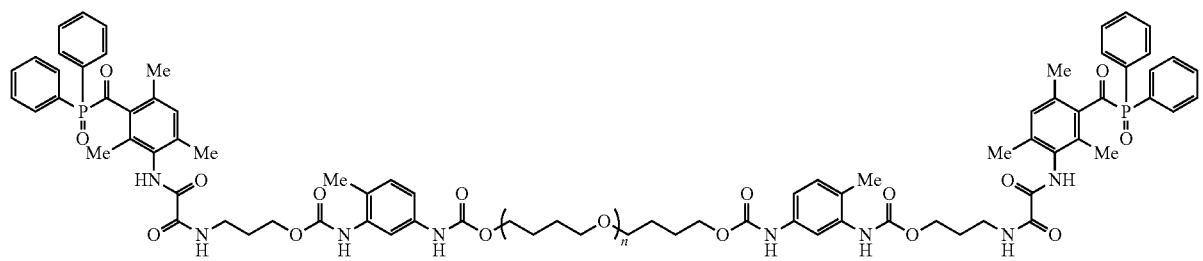

with n=1 to 20;
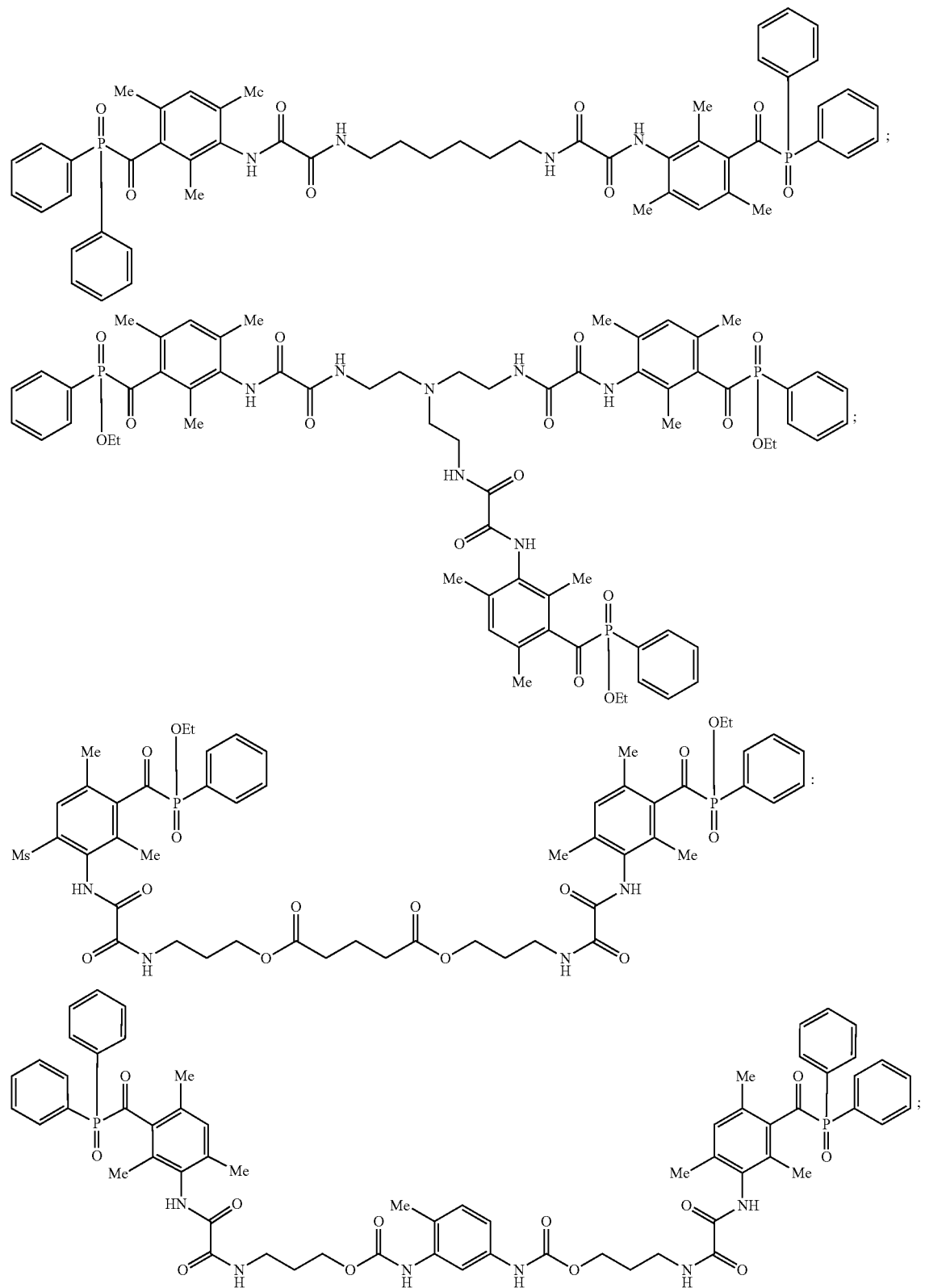

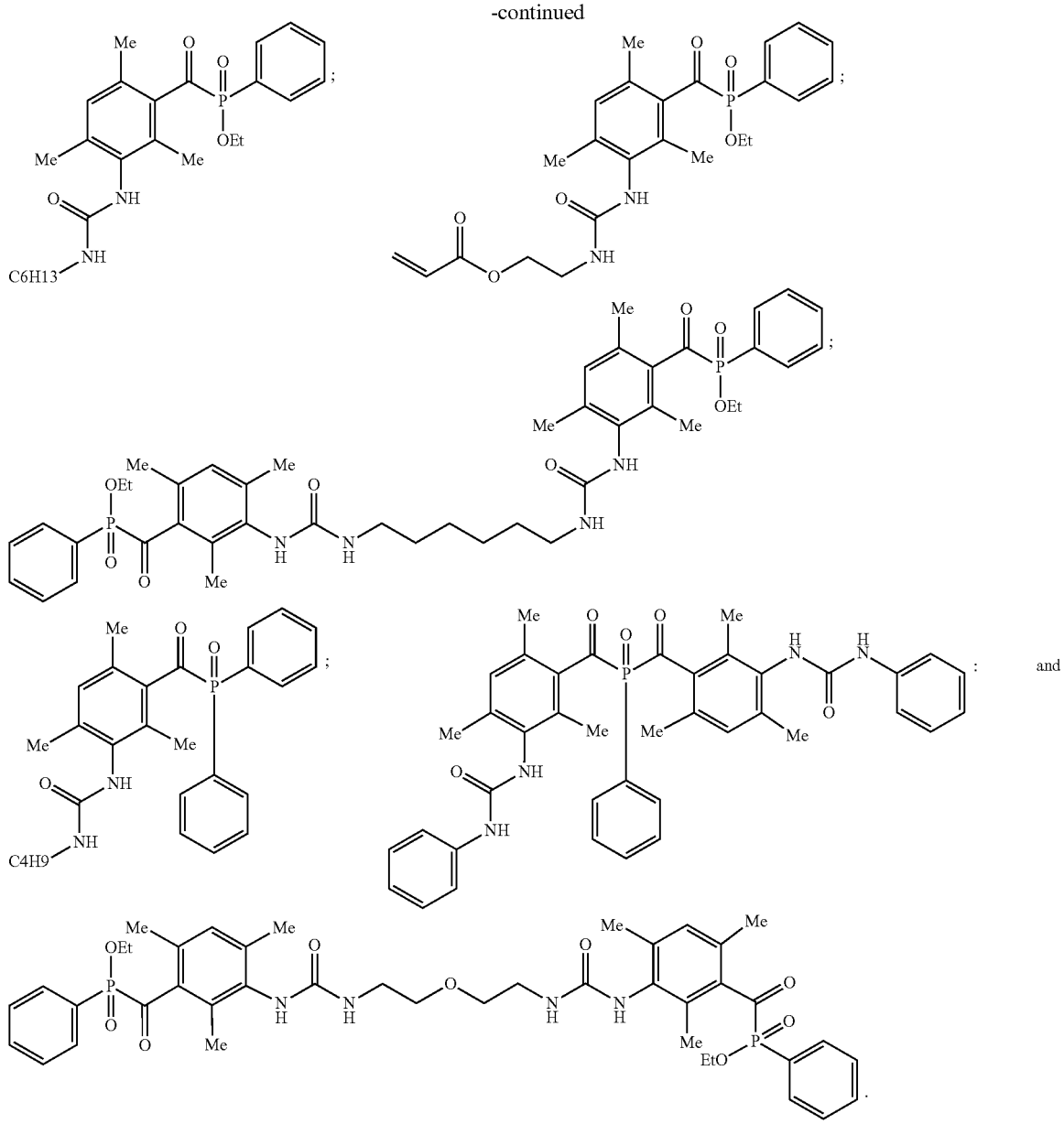

7. A UV curable composition comprising a polymerizable compound and the acyl phosphine oxide initiator of claim 1.

8. The UV curable composition of claim 7, wherein the UV curable composition is a UV curable inkjet ink.

9. A UV curable composition comprising a polymerizable compound and the acyl phosphine oxide initiator of claim 2.

10. The UV curable composition of claim 9, wherein the UV curable composition is a UV curable inkjet ink.

11. A UV curable composition comprising a polymerizable compound and the acyl phosphine oxide initiator of claim 3.

12. The UV curable composition of claim 11, wherein the UV curable composition is a UV curable inkjet ink.

13. A UV curable composition comprising a polymerizable compound and the acyl phosphine oxide initiator of claim 4.

14. The UV curable composition of claim 13, wherein the UV curable composition is a UV curable inkjet ink.

15. A UV curable composition comprising a polymerizable compound and the acyl phosphine oxide initiator of claim 5.

16. The UV curable composition of claim 15, wherein the UV curable composition is a UV curable inkjet ink.

17. A UV curable composition comprising a polymerizable compound and the acyl phosphine oxide initiator of claim 6.

18. The UV curable composition of claim 17, wherein the UV curable composition is a UV curable inkjet ink.

* * * * *